United States Patent
Kopf et al.

(10) Patent No.: US 7,046,711 B2
(45) Date of Patent: May 16, 2006

(54) HIGH POWER AND HIGH GAIN SATURATION DIODE PUMPED LASER MEANS AND DIODE ARRAY PUMPING DEVICE

(75) Inventors: Daniel Kopf, Rothis (AT); Michael Schmidt, Feldkirch (AT)

(73) Assignee: High Q Laser Production GmbH, Hohenems (AT)

( * ) Notice: Subject to any disclaimer, the term of this patent is extended or adjusted under 35 U.S.C. 154(b) by 0 days.

(21) Appl. No.: 10/006,396

(22) Filed: Dec. 10, 2001

(65) Prior Publication Data

US 2002/0085608 A1    Jul. 4, 2002

Related U.S. Application Data

(63) Continuation-in-part of application No. PCT/EP00/05336, filed on Jun. 9, 2000.

(60) Provisional application No. 60/146,472, filed on Jul. 30, 1999, provisional application No. 60/138,906, filed on Jun. 11, 1999.

(51) Int. Cl.
   *H01S 3/091*   (2006.01)
(52) U.S. Cl. .............................. 372/75; 372/34; 372/36
(58) Field of Classification Search .................. 372/96, 372/99, 108, 29, 18, 92
   See application file for complete search history.

(56) References Cited

U.S. PATENT DOCUMENTS

| | | | | |
|---|---|---|---|---|
| 3,866,141 A | * | 2/1975 | Milam et al. | 372/18 |
| 4,088,964 A | * | 5/1978 | Clow | 372/19 |
| 4,185,891 A | * | 1/1980 | Kaestner | 372/9 |
| 4,475,788 A | * | 10/1984 | Tomassini et al. | 385/33 |
| 5,103,457 A | * | 4/1992 | Wallace et al. | 372/92 |
| 5,317,447 A | * | 5/1994 | Baird et al. | 359/328 |
| 5,513,201 A | * | 4/1996 | Yamaguchi et al. | 372/75 |
| 5,936,984 A | * | 8/1999 | Meissner et al. | 372/34 |
| 6,044,096 A | * | 3/2000 | Wolak et al. | 372/36 |
| 6,122,097 A | * | 9/2000 | Weston et al. | 359/345 |
| 6,212,216 B1 | * | 4/2001 | Pillai | 372/96 |
| 6,240,116 B1 | * | 5/2001 | Lang et al. | 372/50 |
| 6,259,711 B1 | * | 7/2001 | Laurell | 372/22 |
| 6,263,004 B1 | * | 7/2001 | Arvidsson et al. | 372/11 |
| 6,347,109 B1 | * | 2/2002 | Beach et al. | 372/75 |
| 6,393,035 B1 | * | 5/2002 | Weingarten et al. | 372/18 |

* cited by examiner

FOREIGN PATENT DOCUMENTS

EP    0 982 818 A2    3/2000

*Primary Examiner*—Minsun Ch Harvey
*Assistant Examiner*—Dung T. Nguyen
(74) *Attorney, Agent, or Firm*—Oliff & Berridge, PLC

(57) ABSTRACT

A diode pumped solid state laser for producing a high aspect ratio beam comprises a diode pumping array (1) on a diode array mount (3) and optical means for imaging a pump light beam onto a substantially asymmetrical spot with a smooth intensity profile. The pump light beam is pumping a laser medium (4). Both the pump and the lasing mode have strong asymmetries. In combination with the right choice of laser medium (4), this results in high power laser performance. The axis of the pump light beam is adjustable by a simple adjusting means (110) to a defined plane or direction relative to a mounting frame (111) of a diode array pumping device (103). The adjusting means (110) compensates small tolerances on mounting of the diode array (1) and/or at least one optical element (2). The adjusting means include at least one wedged window (127). Because of this adjustment the axis of the light beam lies in a defined plane relative to the mounting frame (111) of the pumping device (103). Therefore the diode array pumping device (103) of a laser is replaceable without any further adjustment.

43 Claims, 19 Drawing Sheets

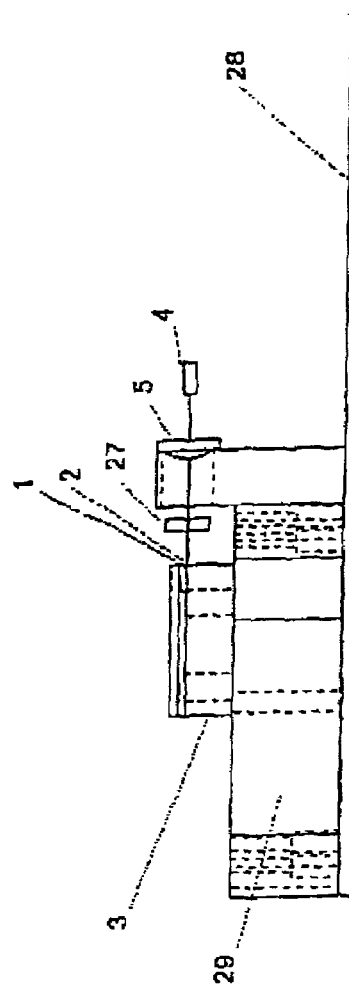
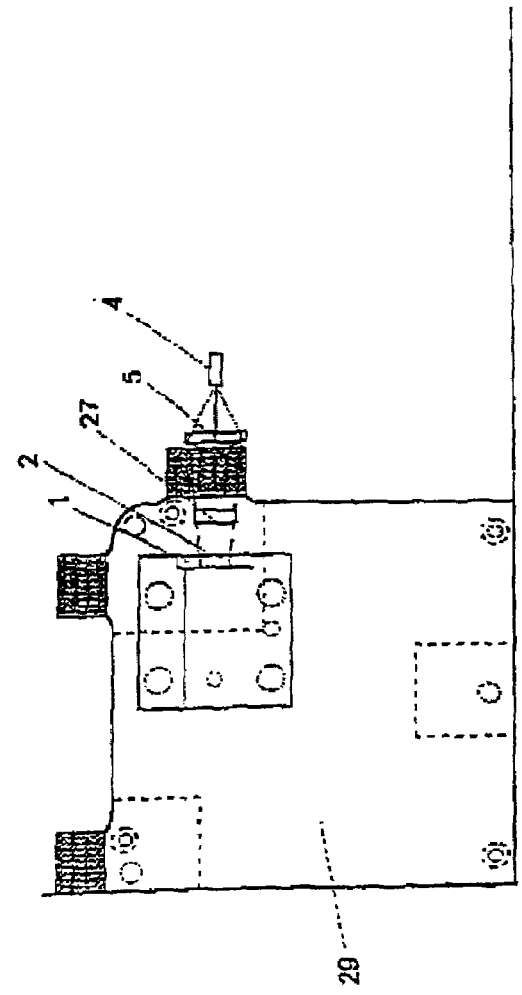
Fig. 1a
Fig. 1b

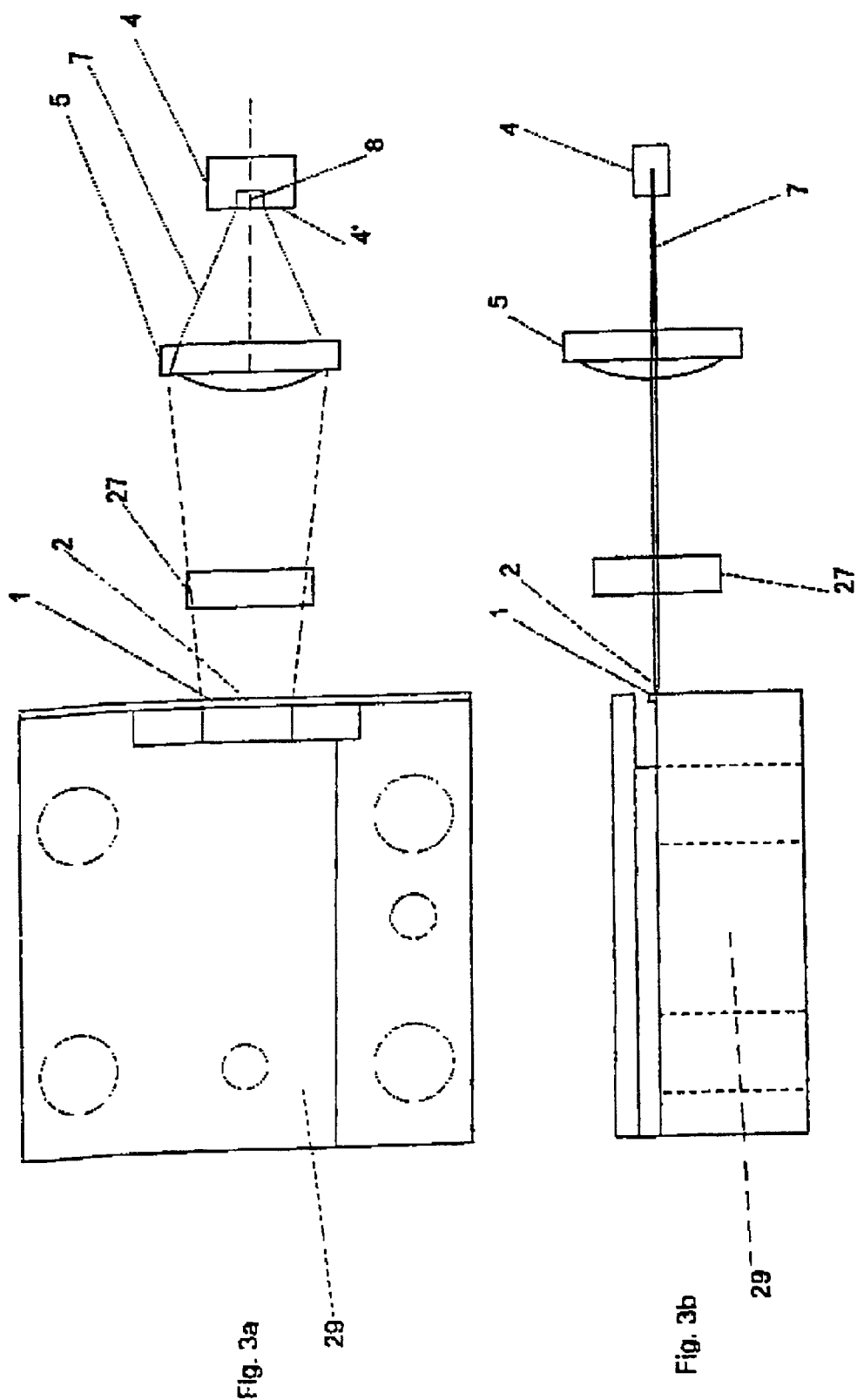

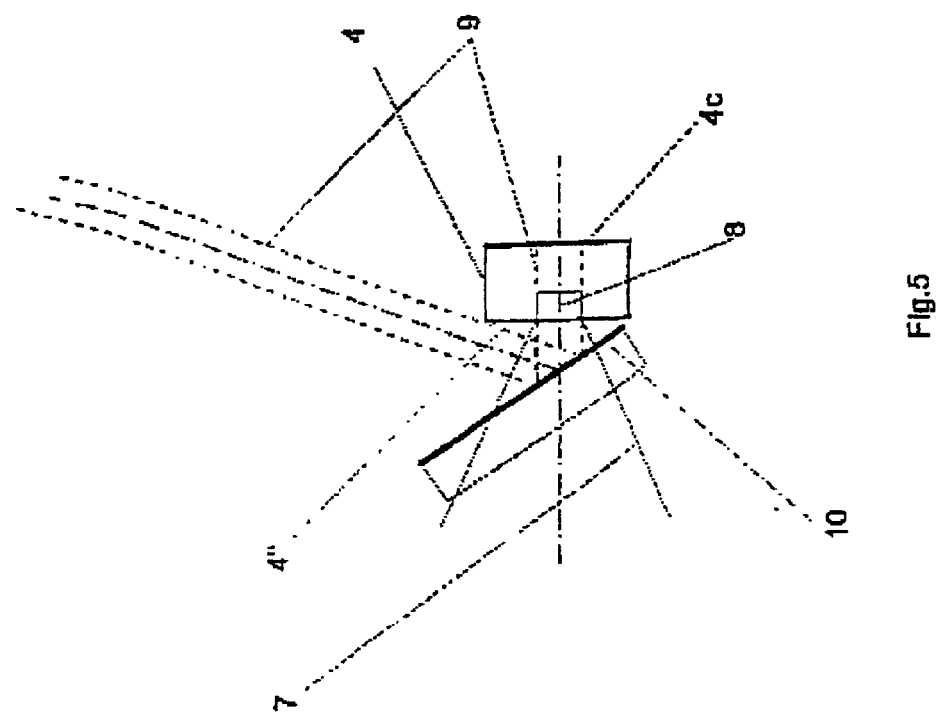

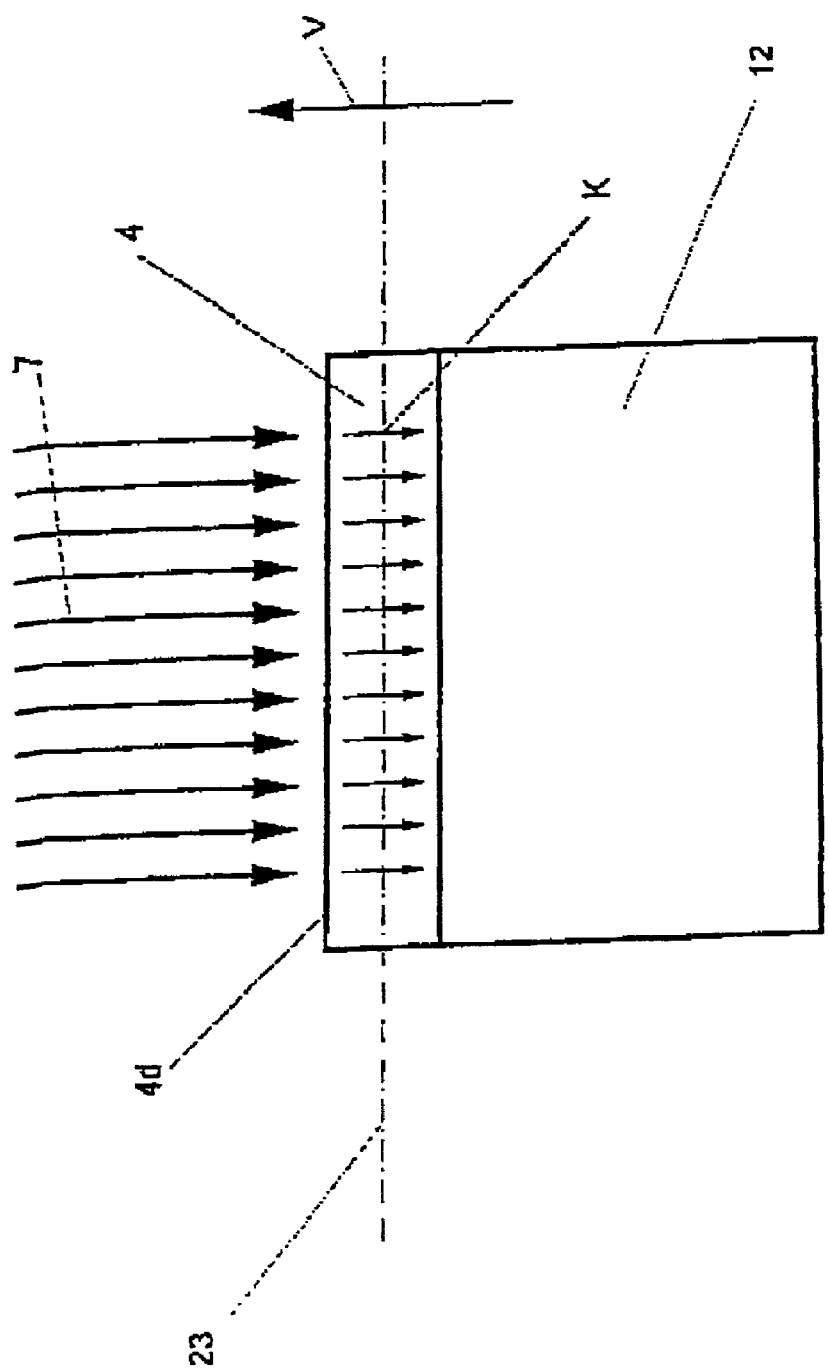

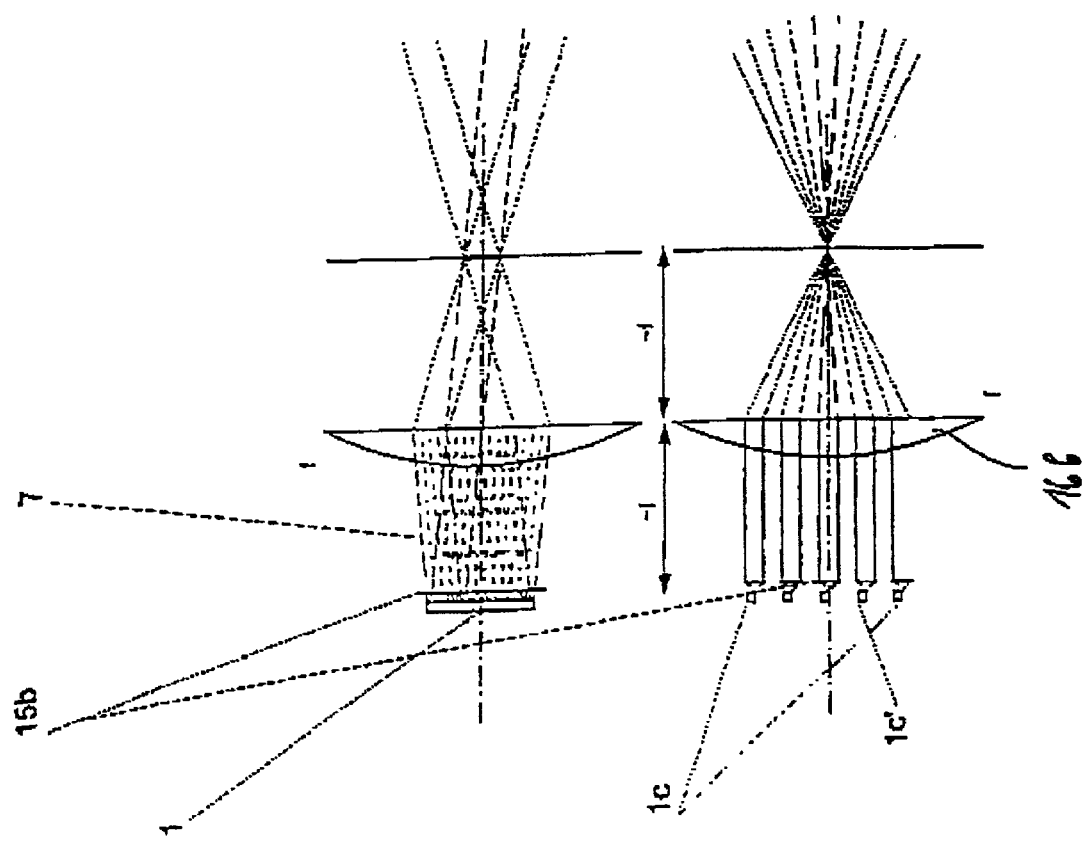

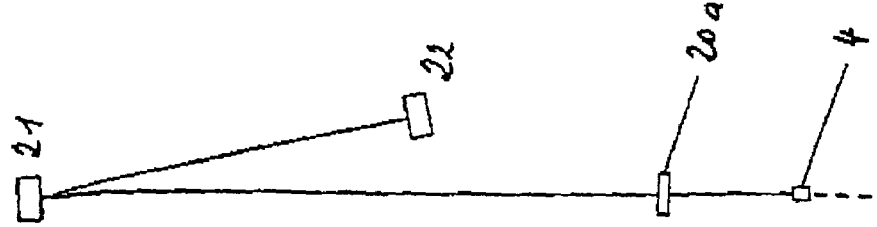
Fig. 9b
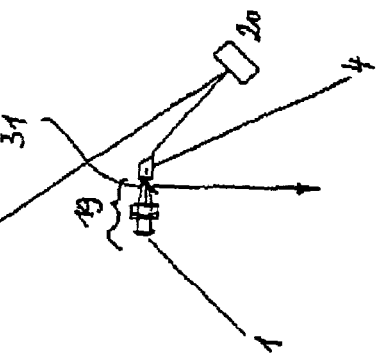
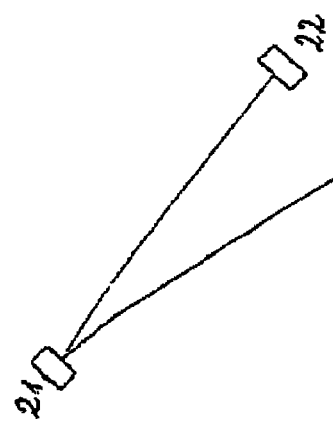
Fig. 9a

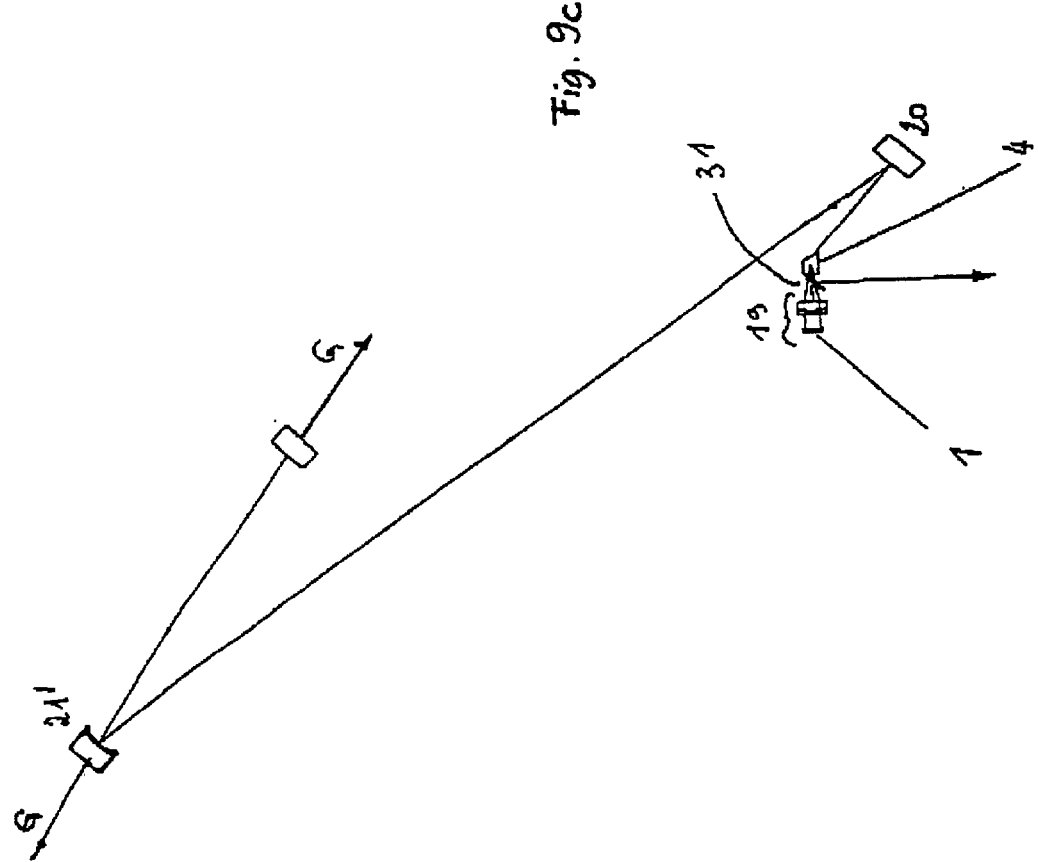

HIGH POWER AND HIGH GAIN SATURATION DIODE PUMPED LASER MEANS AND DIODE ARRAY PUMPING DEVICE

This is a Continuation-in-Part of Application No. PCT/EP00/05336 filed Jun. 9, 2000, which in turn claims priority from 60/138,906, 60/146,472 and 09/489,964. The entire disclosure of the prior application(s) is hereby incorporated by reference herein in its entirety.

FIELD OF THE INVENTION

This invention relates to the field of compact, laser-diode pumped solid state laser sources using a scheme where both the pump and the lasing mode have strong asymmetries.

BACKGROUND OF THE INVENTION

High power diode-pumped lasers have been a subject of intense research recently. Powers in the range of several 100 Watts have been demonstrated from such laser systems. However, with respect to fundamental mode operation (TEM00-mode), such diode-pumped laser sources have shown only a few tens of Watts of output power even in various approaches to the matter. These TEM00, high power diode-pumped laser sources are typically based on the laser mediums Nd:YAG, Nd:Vanadate, Nd:YLF or Yb:YAG. However, in the case of generating TEM00 modelocked output (picosecond or femtosecond pulses) or TEM00 frequency doubled output (green at a wavelength of 532 nm from diode-pumped Nd:Vanadate, for example), even in relatively complicated setups lower powers of the order of 10 Watts or less have been produced. Among the challenges are: keeping the overall setup simple and compact; in modelocked systems: keeping the pulse width as short as possible for subsequent nonlinear optical applications (<10 ps for Nd:Vanadate, for example), in modelocked systems using semiconductor saturable absorbers: finding a design which puts the laser safely into stable modelocking sufficiently far above the modelocked-Q-switching threshold, in intracavity frequency converted laser systems: avoiding the "green problem" or similar output instabilities.

It has long been thought that intracavity optical frequency doubling is subject to the "green problem", which results in unstable fluctuations of the frequency-converted output from the laser. Recently some setups have been disclosed which overcame this problem. This invention shows another method to avoid the green problem.

Modelocking of solid state lasers has been achieved with semiconductor saturable absorbers. However, the dynamics of the modelocking calls for high gain saturation, which can be achieved with the schemes described here. The higher the gain saturation, the lower the pulse energy density on the semiconductor saturable absorber can be reducing the degradation rate of the semiconductor saturable absorber. High gain saturation is usually obtained by achieving high pump intensity, which is however limited by the fracture limit of laser materials. Therefore, pump powers in these types of lasers have typically been limited to 10–20 W pump power per spot in state-of-the-art Nd:Vanadate lasers, or multiple pump spots have been used, adding complexity to the system. Furthermore, thermal lensing limits the maximum pump power per spot.

SUMMARY OF THE INVENTION

The invention relates to the field of compact, laser-diode pumped solid state laser sources using a scheme where both the pump and the lasing mode have strong asymmetries. A substantially smooth asymmetric laser diode pump spot is obtained from a laser diode array source or multiple arrays, by imaging each single emitter of the array or the arrays into substantially the same spot at the laser medium. In combination with the right choice of laser medium, this results in high power laser performance. This can also give rise to high gain saturation inside the laser medium. As an alternative, a diode pumping setup and crystal geometry where the pump beam has not the same propagation axis as the laser mode can be used. The laser medium does not necessarily have a coating reflective for the laser wavelength attached to it. In combination with an intracavity nonlinear optical element, such as a nonlinear optical crystal or a semiconductor saturable absorber, this can lead to stable intracavity non-linear conversion and stable ultra short pulse generation, respectively. A special semiconductor saturable absorber structure for generating ultra short laser pulses is described. Additionally, external frequency conversion schemes can be efficiently used to generate other frequencies from the ultra short pulse output. The scheme may, however, also be used for high power continuous-wave or Q-switched laser operation. According to a special embodiment of the invention, The axis of the pump light beam is adjustable by a simple adjusting means to a defined direction relative to a mounting frame of a diode array pumping device. The adjusting means compensates small tolerances on mounting of the diode array and/or at least one optical element. The adjusting means include at least one wedged window. Because of this adjustment the axis of the light beam lies in a defined plane relative to the mounting frame of the pumping device. Therefore the diode array pumping device of a laser is replaceable without any further adjustment.

An additional field of application is the pumping of a laser source containing a regenerative amplifier or other single- or multi-pass amplifier setups. For this type of setup small and focused pump laser spots lead to problems as optical damages and as a too high gain may occur within a limited volume of the laser medium, which may lead to beam distortion and diffraction losses. A pumping device which produces a pattern-free profile with reduced intensity fulfills the special requirements of this setup. Suitable pump spots have a cross section with a substantially low aspect ratio, that for example is 1:1 or may be defined by the refraction index n as 1:n (e.g. with n=2,16 for Nd:vanadate).

The invention is not restricted to the combination of the described parts of the laser, but also to the parts as such.

BRIEF DESCRIPTION OF THE DRAWINGS

FIG. 1a and 1b show side and top views, respectively, of the setup of a laser diode array for pumping a laser medium;

FIG. 3a and 3b show top and side views, respectively, according the setup of FIG. 1a and 1b and—in more detail—the pumping light beam optics;

FIG. 5 represents the arrangement of a laser medium and a cavity fold mirror as input coupling element for the pump beam;

FIG. 7 represents a cross-sectional view through a transversely pumped, transversely cooled, thin laser medium;

FIG. 8a, 8b, 8c and 8d show different embodiments of the laser diode array and the pumping light beam optics, in top and side views;

FIG. 9a, 9b and 9c represent resonant cavities with different optical elements;

FIG. 11b an alternative setup according to FIG. 11a;

DESCRIPTION OF THE PREFERRED EMBODIMENT

Figure 2A:
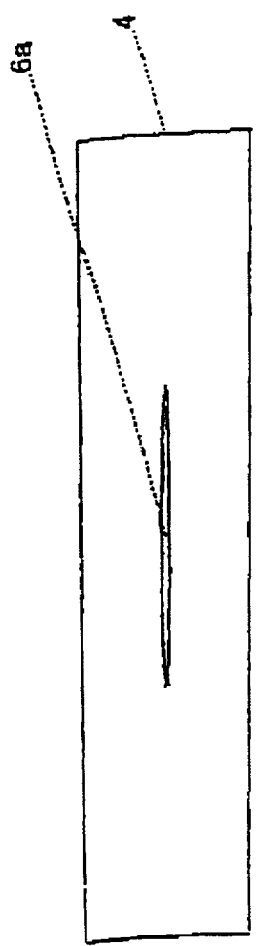
FIG. 2a, 2b and 2c show cross-sectional views of the laser medium with different pump spots geometries.

High intensity pump: FIG. 1 shows a simple setup to focus the outcoming beam from a high power laser diode array to a high intensity spot. The laser diode light is imaged through a small number of optical elements into a laser medium. Even the addition of one or more optical elements such as a spherical or cylindrical lens still ensures a simple setup and can be used to tailor the spot size in the horizontal and vertical plane, respectively.

The laser diode used preferably emits from an emitting area which is 1 micrometer (μm; micron) in height (vertical dimension) and typically 2 mm up to 10 mm (horizontal dimension). Laser diodes with a 10 mm wide emitting area on a single chip emit output powers in the 20–60 W range in a highly non-diffraction limited beam (ca. 2000 times the diffraction limit in the horizontal dimension for a 10 mm wide emitting area). These high power diode "bars" usually consist of an array of lasers provided on the same chip: For example, a 40 W laser diode may consist of an array of 20 lasers each with a 200 μm wide stripe and a center-to-center spacing of 400 μm. In this case, the fill factor is 50%, corresponding to the active area divided by the total area, which also includes the inactive spacer area in between two adjacent diodes on the same chip or "bar".

FIG. 1 shows the sketch of a configuration according to the invention. A laser diode array 1—for instance with a total width of 5 mm and an emitted power of 15 W at a wavelength of 808 nm—has been used. The light from this laser diode is typically strongly diverging in the vertical axis ("fast" axis) at an angle of approximately +/−30°, for example. Therefore, the first optical component in the imaging optics is preferably a fast-axis collimation lens 2, which collects the light in the vertical dimension, for instance a cylindrical lens with a focal length of approximately 200 μm in the vertical dimension. This lens is attached to a mount 3 on which also the laser diode chip ("bar") is mounted. In some cases, it is not necessary to use a cylindrical lens, especially as long as the emitting area aspect ratio is not much higher than 500 μm:1 μm (horizontal dimension: vertical dimension). Generally it is preferable to use high numerical aperture (NA=0.5 approximately) lenses which are capable of collecting all or substantially all power in the vertical dimension, where the divergence is usually much higher than in the other dimension.

For the purpose of focusing the diode laser light into a laser medium 4, a f=8 mm focal length lens 5 with a high NA and good imaging quality is used, for example the item number C240TM-B from Thorlabs, Inc. This lens 5 is positioned at a distance of about 20 mm from the diode laser 1. Aspherical lenses can have the advantage of improved imaging quality and therefore higher intensity is achieved at the pump spot.

The focusing optics as described generates a bright and highly asymmetric pump beam inside the laser medium 4, which is well suited for pumping a laser cavity with a vertically squeezed laser mode inside the laser medium 4. This is described in more detail in D. Kopf, K. J. Weingarten, G. Zhang, M. Moser, A. Prasad, M. A. Emanuel, R. J. Beach, J. A. Skidmore, U. Keller, Invited Paper, "High-average-power diode-pumped femtosecond Cr:LiSAF lasers," Applied Physics B, vol. 65, pp. 235–243, 1997. The invention uses a different concept based on different focusing and on different laser gain materials. Furthermore, different crystal and pumping geometries are described.

The use of a high NA focusing lens, as mentioned above, has the advantage that a high intensity spot is generated. According to the setup described above, a pump spot is generated which is 740 μm×20 μm (radius) in the horizontal and vertical plane, respectively. At a power of 15 Watts, this corresponds to a pump density of 32 kW/cm$^2$. With higher powers and equivalent beam parameters (divergence, stripe width) the pump intensity would go up correspondingly. This corresponds to pump densities which are hardly achieved otherwise in such a simple manner. Based on the concept described above, a man skilled in the art can devise with similar and modified setups which also achieve a high intensity spot.

The distance between the laser diode array 1 and the focusing lens 5 can be changed which results in an astigmatism after the focusing lens, i.e. the pump beam waists in the horizontal and vertical dimension, respectively, are at different locations. The astigmatism can be used to generate a tailored and predetermined ellipticity of the pump beam at the entrance face of the laser medium 4, resulting in tailored thermal lenses in the two transverse dimensions.

Likewise, the distance between the laser diode array 1 and the focusing lens 5 can be changed in order to control the intensity distribution at the laser medium 4. It is usually preferable to achieve an as smooth as possible transverse power distribution with a negligible pattern to it. This can be accomplished if the image of the laser diode array 1 is as far away from the focal plane of the lens as possible, ideally infinitely far away. This is achieved if the laser diode array 1 is positioned one focal length away from the lens 5, which would be at a distance of 8 mm in our case. Satisfactory results, however, may also be obtained in the vicinity of this condition. Applied to our setup, a substantially smooth light distribution at the pump spot is obtained if the f=8 mm focusing lens is positioned 8 mm beyond the laser diode array 1, with a fast axis collimating cylindrical lens 2 positioned next to the latter. A smooth light distribution results in a smooth an pattern-free thermal distribution and therefore in a thermal lens which facilitates or enables laser operation in the fundamental mode.

The laser diode array 1 is mounted on a submount 3 which is positioned on a laser system base 28. The laser diode array 1 may be constructed as a module within a housing. In this case a wedged window 27 is provided for the pump beam to pass.

Figure 2B:
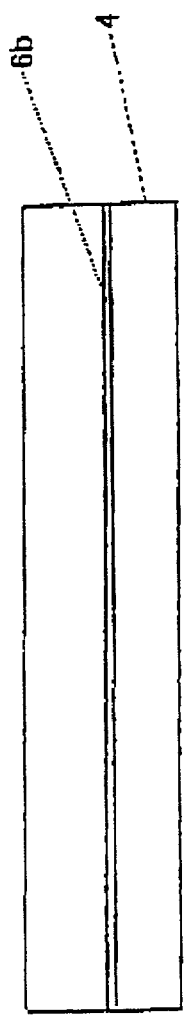
Figure 2C:
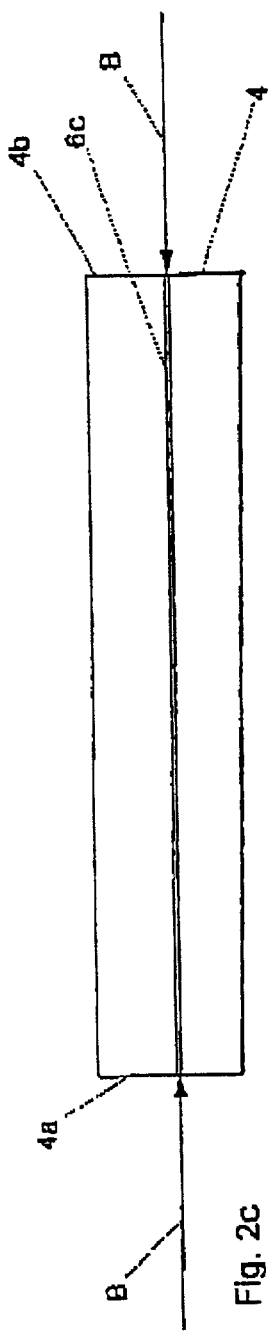

Choice of laser gain material, crystal geometry, pumping geometry, cooling: The highly assymetric, essentially elliptical pump spot obtained as above is focused into the laser gain material, where a great deal of the power is absorbed within the absorption length. FIG. 2-A shows a cross-sectional view of the laser medium 4 and the elliptical pump spot 6a. The cross-section of the laser medium 4 can be (as is here) 4 mm×0.8 mm and the pump spot 6a can be 0.74 mm×0.02 mm radius (as is shown schematically in FIG. 2-A). The vertically squeezed crystal dimension results in a predominantly one-dimensional heat flow which reduces the thermal lensing effect. The wider the beam in the horizontal plane, the more pronounced is the one-dimensionality of the heat flow, i.e. the heat flows mostly vertically. This results in a smaller thermal lens in the horizontal plane. Consequently, pumping is possible at higher power levels thus achieving higher output powers.

The highly elliptical pump spot also has the advantage of reduced thermally induced birefringence, which was shown to limit laser performance in various lasers, in particular in Nd:YAG lasers. Therefore, the setups described here can also be used to avoid thermal birefringence limitations.

A highly asymmetric pump spot 6b can also be obtained by choosing a horizontal pump spot size which is equal or almost equal to the horizontal dimension of the laser medium 4 (FIG. 2-B). Thereby an optimum vertical heat flow can be achieved when additionally the laser medium 4 is contacted to the heat sink at the top and the bottom only. This results in a negligibly small thermal lens in the horizontal dimension. In order to achieve scaling of modelocked or frequency converted lasers into the power range of 10 W or more, this approach can be used to overcome horizontal thermal lens limitations.

As an alternative approach, FIG. 2-C depicts a pumping scheme which also achieves a highly elliptical pump spot 6c size but is pumped transversely (according to arrows B), i.e. from one side 4a or from both sides 4a, 4b, for example using similar focusing schemes as in the setups above. For this purpose, the sides 4a, 4b should be polished and preferably anti-reflection coated. This can be a way to combine the power of two diodes and thus increasing the total power that can be extracted from the laser cavity.

FIGS. 3-A, 3-B show an overall diode-pumping scheme including the laser medium 4. The diode pump beam 7 is also schematically depicted and results in a highly elliptical pump beam.

The position of the laser medium 4 can be adjusted: The distance from the focusing lens 5 determines the actual pump spot at the entrance face 4' of the laser medium thus affecting both the laser gain and the thermal lens. This can be used to optimize laser performance, i.e. output power.

The laser medium crystallographic orientation can help reduce the horizontal thermal lens if the laser medium exhibits different thermal conductivity along the crystallographic axes. If the vertical axis is chosen to be the one with the highest heat conductivity, then again the vertical, one-dimensional heat flow is more pronounced, resulting in another reduction in the horizontal thermal lens, thereby forming a basis for further power optimization. This is the case, for example, for Cr:LiCAF, which exhibits a 10% difference in thermal conductivity for the heat flow along the two crystallographic axes.

The polarization of the cavity mode can be chosen such that it points along the crystallographic axis which has lower dn/dT, resulting in lower thermal lensing. This is, for example, interesting when using Nd:YLF, which exhibits less than half the dn/dT for a polarization perpendicular to the c-axis compared to the direction parallel to the c-axis.

Figure 4C:
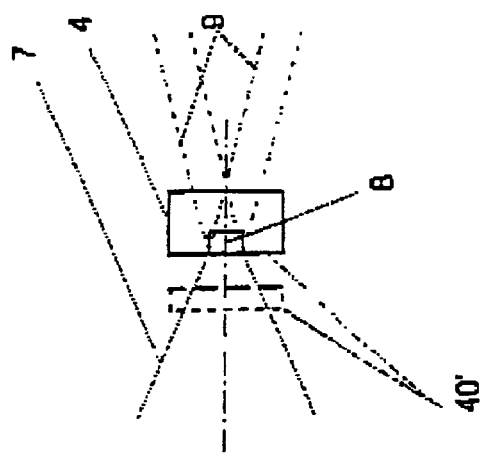
FIG. 4a, 4b and 4c show alternative embodiments for a laser medium and the related closest reflective cavity element.
Figure 4B:
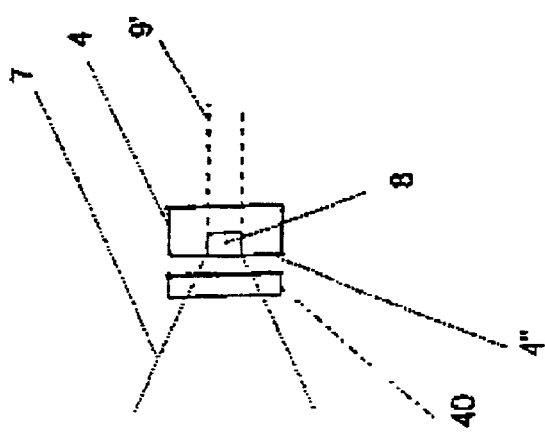
Figure 4A:
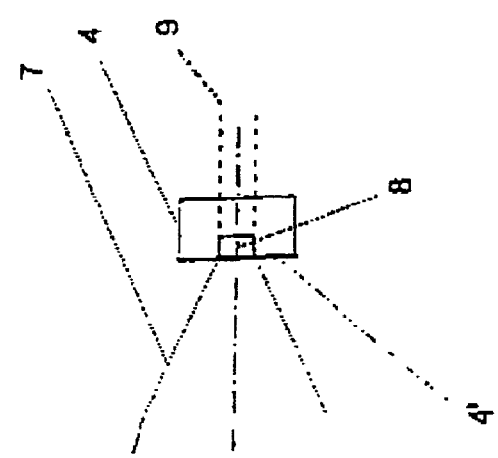

Laser medium arrangement and positioning: FIG. 4-A shows an end-pumped scheme where the entrance face 4' of the laser medium is transparent for the pump beam but highly reflecting for the laser mode 9 (dashed lines to the right). As an alternative, the face of the laser medium 4' can be chosen as partially reflecting for the laser mode and thus can be used as an output coupler. In this case, the laser output can be separated from the incident diode pump light by a dichroic mirror. The Laser diode pump beam 7 will be absorbed in the pump absorption region 8 of the laser medium 4.

FIG. 4-B shows a scheme where the laser end mirror 40 is not attached to the face 4" of the the laser medium 4 but is an independent optical element. The laser medium 4 is adjacent to this end mirror 40. The spacing between the two elements can be substantially less than a millimeter but also several millimeters long. At sufficiently short spacings the picosecond modelocked laser produces substantially shorter pulses due to spatial hole burning. This can be used to achieve higher peak powers due to the shortened pulses.

FIG. 4-C shows alternative setups according to FIGS. 4-A and 4-B. The face of the laser medium or the end mirror of FIGS. 4-A and 4-B do not necessarily have to be used as end mirrors but can be used as fold mirrors 40', in which case the laser mode 9" is folded and passes through the laser medium 4 four times per round trip, increasing the amount of saturation in the excited region, the pump absorption region 8, of the laser medium 4. Likewise, the cavity optics (an example is given in FIG. 9-A) can be arranged such that an even higher number of passes through the pumped laser medium 4 per roundtrip occurs, resulting in higher small signal gain per round trip and higher gain saturation. In this case one or more cylindrical mirrors may be used. The cavity mode can be designed such that it passes the pumped spot even more often per round trip if the cavity optical elements are arranged accordingly, resulting in another small-signal gain increase. This is interesting also when the laser medium is used as the gain medium in an optical multi-pass amplifier or regenerative amplifier. The laser medium 4 and its orientation can be chosen such that the cavity mode polarization remains unchanged after passage through the laser medium 4 by avoiding polarization effects due to birefringence. For example: Nd:YLF can be oriented such that both a-axes define a plane in which the polarization of the incoming and outgoing cavity mode lie, respectively. This makes Nd:YLF interesting for both high power oscillators and amplifiers in a folded cavity mode configuration. Nd:YAG and Nd:glass have the advantage that they are not birefringent and therefore also suitable for the same configuration.

Another approach is possible which has the same advantages as end-pumping, but avoids direct end-pumping. Such an approach is shown in FIG. 5, where the pump beam 7 is coupled in through a dichroic cavity fold mirror 10 which is highly reflective for the laser light and highly transmissive for the pump beam 7. The laser medium 4 is pumped from the side opposing the cavity end 4c. For sufficiently short laser media (i.e. only few millimeters long or equal to or even shorter than 1 mm in the direction of the beam) the spatial hole burning can be used for pulse shortening. The side 4" from which the laser medium 4 is pumped may be a Brewster face or an anti-reflection-coated flat or wedged side (the wedge can be used to avoid internal reflections). The cavity end side 4c of the laser medium 4 can be coated for high or partial reflection of the cavity mode. If partially reflecting for the laser mode 9, that side may be used as an output coupler. The same coating may be highly reflective for the pump 7, which is particularly useful if not all pump light is absorbed in one pass through the laser medium 4. This configuration using a crystal end face coating with a doubly reflecting coating is particularly useful if the laser medium 4 has non-negligible scattering losses, such as Cr:LiCAF or Cr(4+):YAG for laser oscillation around 800 nm and 1450 nm, respectively. For the case of Cr:LiCAF and Cr:YAG, an absorption length of less than 3 mm or 5 mm, respectively, can be used to reduce the scattering losses per roundtrip while still having the advantage of an effective (double-bounce) absorption length of 6 mm and 10 mm, respectively. Likewise, laser mediums which have ground-state absorption can be used in this configuration at reduced absorption losses for the laser mode, resulting in enhanced output performance. For example, this can be used to enhance the output power performance of 3-level or quasi-3-level laser mediums such as Nd:Vanadate and Nd:YAG operated at the 917-nm or 946-nm line, respectively, Yb:glass, Yb:YAG, Er—Yb:glass.

Figure 6:
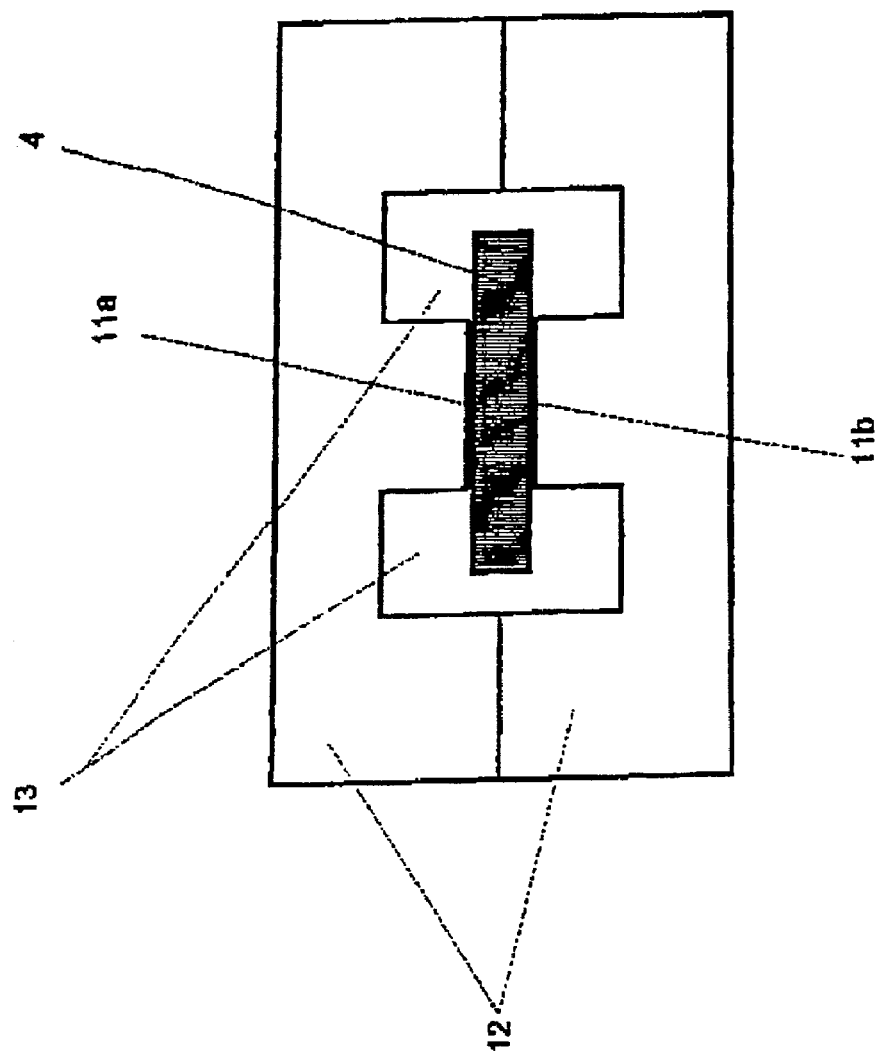
FIG. 6 represents the laser medium in cross-sectional view.

FIG. 6 shows a crystal holding technique, which is for instance used to hold a 15-W-pumped Nd:Vanadate laser generating up to 4 W of 7 picosecond pulses at a wavelength of 1064 nm and a repetition rate of 82 MHz whereby a pump concept is used as described here. An output coupler of 4% can be used. A semiconductor saturable absorber mirror was used as the modelocking device. It is to be understood that increasing the pump power will result in increased lacer output power.

FIG. 6 shows a cross-sectional view of the the laser medium positioned in between contacting surfaces 11a, 11b at the top and the bottom, respectively. Only a portion of the laser medium top and bottom surface is supported, respectively. Adjacent to this portion regions 13 are provided that comprise air or another material with low thermal conductivity As a contacting medium, thin Indium foil (for example 50 µm thick Indium foil) can be used which reduces mechanical stress due to its soft nature and furthermore ensures a good thermal contact. Other alternatives include the use of thermally conductive glue such as TraBond 2151 or 2158. The heat sink 12 surrounding the laser medium 4 can be made from aluminum, copper or brass or any thermally conductive medium. The fact that the laser medium is supported only on limited contact areas firstly results in a more pronounced one-dimensionality of the heat flow from the elliptical pump spot in the middle of the laser medium 4 to the top and the bottom surfaces, respectively. The resulting reduction in horizontal thermal lensing allows for improved power scaling towards higher powers. Secondly, the mechanical contact areas are restricted to smaller areas, which reduces the danger of cracking the material or causing mechanical stress inside.

Choice of laser medium: The laser media 4 that can preferably be used for high power laser output are among, but not limited to, Nd:YAG, Nd:Vanadate, and Nd:YLF. These materials have different gain and thermal lensing properties. Among these Nd:vanadate has the highest stimulated emission cross-section and the shortest upperstate lifetime which makes it suitable for stable modelocking and intracavity nonlinear conversion. Nd:YLF has the widest emission band width and can therefore provide the shortest modelocked pulses, for example 3 ps pulses. In addition, Nd:YLF has the lowest thermal lensing which makes it suitable for high power, i.e. >5 Watt output using the schemes of this invention. All of these materials may be used for high laser power performance up to 10 Watts or multiple 10 Watts. A man skilled in the art can optimize the pump beam spot inside the laser medium and the laser mode, aiming at optimized mode matching, results in fundamental mode operation at these power levels. Further materials that can be used in the configuration of this invention include Cr:LiSAF, Cr:LiCAF, Cr:LiSGAF, Cr:forsterite, Cr(4+):YAG, Nd:glass, Yb:glass, Yb:YAG, Er:Yb:glass, Nd:vanadate and Nd:YAG operated at the 900-nm and 1300-nm lines, respectively. Furthermore, dye laser media can be provided as laser media.

The Nd:YLF is particularly suitable for scaling to higher powers and higher peak powers due to its broader emission band (compared to Nd:YAG and Nd:vanadate), its reduced thermal lensing and thermal birefringence effects. Its fragility can be addressed by choosing a sufficiently long absorption length of >2 mm. The high intensity pump described here results in sufficiently high gain saturation required for stable modelocking above the modelocked Q-switching threshold, following the rules of C. Hönninger, et al., in "Q-switching stability limits of continuous-wave passive mode locking", Journal of Optical Society of America B, Vol. 16, No. 1, pp. 46 ff.

Figure 8A:
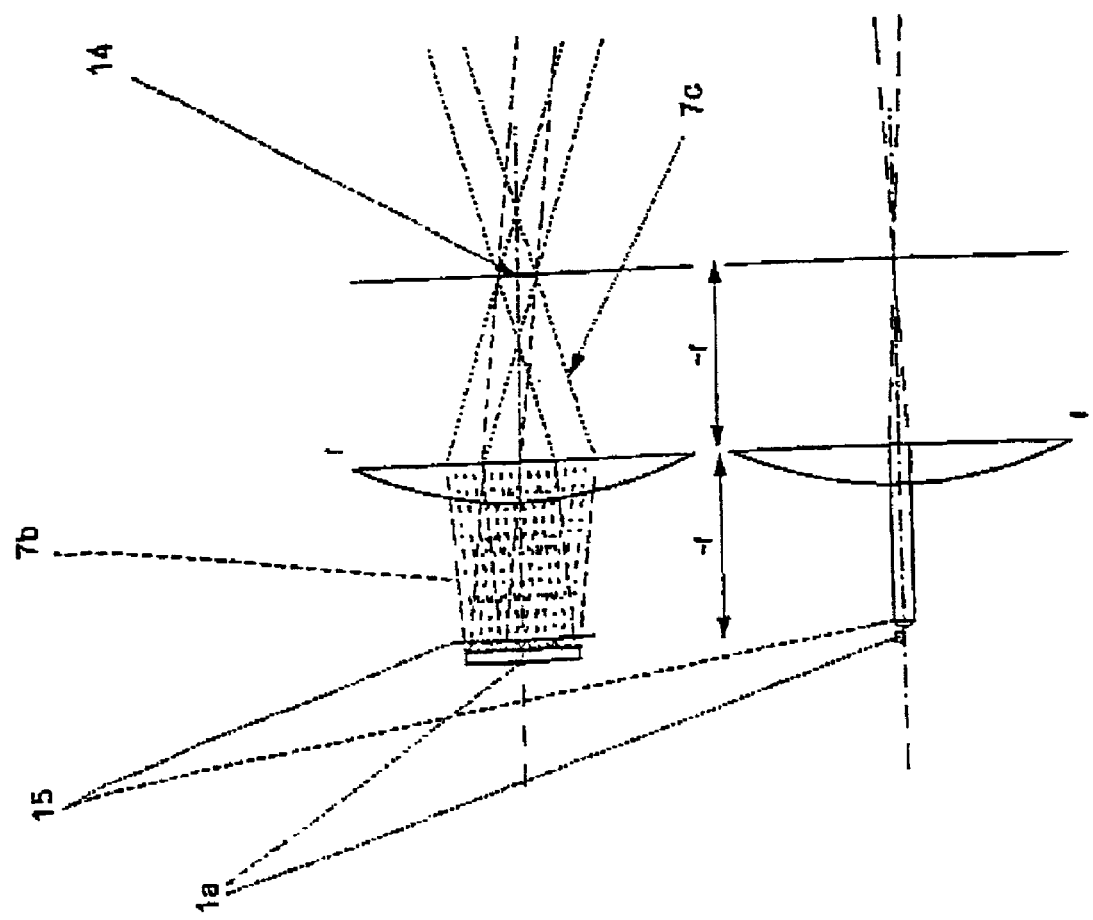

Laser pump setups with a comparatively less small signal gain are suitable for an use within a regenerative amplifier setup. The according minimal amplification of a few percent up to a factor not much in excess of 4 (i.e. 400%) for one roundtrip is sufficient for this type of setup. Note that this is on the order of 10× less small signal gain than achieved in the above-mentioned setup with an asymmetrical pump spot. The characteristic feature is the product of sigma as the emission cross section and tau as the life time of the upper niveau. This product is equal to the small signal gain coefficient. Appropriate values are of the magnitude of $5 \cdot 10^{-24}$ sec/cm$^2$, the value for Nd:YLF or ND:YAG is appr. $6 \cdot 10^{-23}$ sec/cm$^2$, the value for Nd:vanadate is four times higher. These small signal coefficients result in a small signal gain within the range from a few percent per roundtrip up to a factor of ~4 when the pumping scheme of FIG. 8d is used.

Suitable materials are for example: Nd:YAG, Nd:vanadate (Nd:YVO4), Nd:YLF, Yb:YAG, Yb:KYW, Yb:KGW, Yb:SrYBO. Depending on the material-given spectral bandwidth, femtosecond or picosecond pulse amplification is supported.

Intracavity and extracavity frequency conversion: Frequency conversion can be used to generate other wavelengths from a fundamental wavelength, such as 1064 nm in the case of Nd:vanadate and Nd:YAG, or 1053 nm or 1046 nm in the case of Nd:YLF as the laser medium. Frequency conversion systems have been shown to also generate the colors red, reen, and blue from such an infrared picosecond pulse source by using optical parametric oscillators, optical parametric amplifiers, or optical parametric generation. These colors, red, green,and blue, can be used for example in laser projection display applications and for entertainment purposes. Frequency conversion to the ultra violet and to the visible wavelength range results in applications in various fields of research and sciences, such as fluorescence measurements, spectroscopy and confocal microscopy. Frequency conversion to the mid-infrared wavelength range can also be accomplished by employing of optical parametric oscillators and is useful for many applications such as gas sensing and molecular spectroscopy. The laser lines around 900 nm and 1300 nm of Nd:Vanadate (917 nm, 1340 nm), Nd:YAG (946 nm), and Nd:YLF, respectively may also be used as the fundamental wavelength to be converted to other wavelengths. For example, the Nd:Vanadate can be doubled to 457 nm, both in an intracavity or extracavity second harmonic generation scheme.

Intracavity nonlinear conversion can be obtained by placing a nonlinear optical material 30 (according to FIG. 9-C) inside the laser cavity. For example, LBO is known as such a material well suited for intracavity second harmonic generation from the infrared fundamental wavelength to the second harmonic in the visible green (arrows G ind FIG. 9-C). The frequency conversion that can be achieved in such a laser cavity, however, is not limited to the second harmonic generation but may include third and fourth harmonic generation, optical parametric oscillation, optical parametric amplification, and optical parametric generation. The stability of the frequency converted output is also dependent on the degree of laser gain saturation inside the laser medium. Therefore, the scheme described here may be used for stable operation of intracavity frequency conversion. The cavity optics may have to be adapted and calculated for a suitable cavity mode radius at the nonlinear optical medium such that sufficient nonlinear optical conversion is achieved. As an example, in a continous-wave, 1064-nm, intracavity doubled Nd:Vanadate laser (FIG. 9C, laser medium 4) using antireflection-coated (at 1064 nm) LBO as the nonlinear optical material (FIG. 9-C, nonlinear optical material 30), the laser mode radius at a 5 mm LBO crystal could be chosen to be 50 μm as a starting point. Optimization will be reached by systematically increasing or decreasing the laser mode radius at the LBO material. Different LBO material lengths will enhance the output further.

The high peak power modelocked output of a laser as described here can be used for external, i.e. extracavity, frequency conversion. Second harmonic generation is accomplished by using a nonlinear optical crystal with known appropriate cut for phase matching at the fundamental and the doubled optical frequency, respectively. Well known materials for this purpose are KTP and its isomorphes, BBO, KNbO3, LBO, LiNbO3, periodically poled LiNbO3, periodically poled KTP and its isomorphes. A laser source with a peak power of 7 kW, such as the one described here, can be converted to the second harmonic with high efficiencies in KTP, provided that phase matching is obtained and the KTP crystal length is optimized according to the rules well known in nonlinear optics. Third harmonic conversion can be obtained by frequency mixing the fundamental and the second harmonic light in another nonlinear optical crystal suitable for third harmonic generation, such as LBO or BBO. Fourth harmonic generation can be obtained by applying the second harmonic generation process to the second harmonic output, for example using BBO to double the frequency of the frequency doubled Nd:vanadate laser. Due to the high peak power of such a picosecond laser system, other nonlinear optical conversion schemes well known in nonlinear optics may be used to generate other frequencies, such as sum frequency generation, difference frequency generation, third harmonic generation, fourth harmonic generation, optical parametric oscillation, optical parametric amplification, optical parametric generation.

Enhanced nonlinear-optical conversion with picosecond pulses can be obtained if the nonlinear-optical material is configured in an etalon-like configuration for resonating each picosecond pulse and thereby enhancing the peak power. For this purpose, the resonator will have to be shorter than the physical length of an optical picosecond pulse.

When the high power picosecond laser is used to pump an optical parametric oscillator cavity, stable synchronisation of both the pump laser cavity and the optical parametric cavity can be obtained, largely independent of thermal drift, by putting both cavities on the same base 28 (FIG. 1-A), for example an aluminium platform. Expansion of the platform, which results in a longer cavity of the picosecond laser, will then give rise to equivalent lengthening of the optical parametric oscillator cavity, thereby keeping both cavities synchronized.

Modelocking mechanisms: The modelocking can be obtained by using a modelocking apparatus inside the laser cavity. Such a modelocking apparatus can be a semiconductor saturable absorber or a multiple quantum well device. Any optical scheme that acts as a saturable absorber can be used as well. The modelocking dynamics using semiconductor saturable absorbers is dependent on the pulse energy density both on the saturable absorber and inside the laser medium, as well as on the saturation parameters of the saturable absorber and the laser medium. While minimizing the pulse energy density on the saturable absorber, aimed at longer term operation and lower degradation rates, stable modelocking remains, provided that the pulse energy density inside the laser medium is increased. With the scheme according to this invention, the pulse energy density inside the laser medium is already made considerably higher than in most continuous-wave diode-pumped solid state Nd:YAG or Nd:Vanadate lasers. Therefore, the scheme is well suited for long term and stable mode locking operation using a semiconductor saturable absorber.

As an alternatative modelocking mechanism, a nonlinear mirror modelocking technique can be used. Such a mechanism is described, for example, in U.S. Pat. No 4,914,658: Modelocked laser, Stankov, et al.

Q-switching can be obtained by incorporating an optical switching device into the laser cavity.

Transversely pumped, transversely cooled small laser medium laser: Another embodiment according to the invention comprises a transversely pumped, transversely cooled, thin laser medium 4 configuration for high power diode-pumped laser operation. A schematic is depicted in FIG. 7. The laser medium 4 is bonded to a heat sink 12 on one side (bottom side in FIG. 7). The bonding can be done by a thin indium foil and applying pressure until the medium sticks to it. As an alternative, thin layers of glue may be used, such as for example thermally conductive glue as mentioned above. The laser diode pump beam 7 is incident onto the top side 4d of the laser medium 4 and is, at least partially, absorbed in the laser medium. A double or multiple pump light bounce configuration may be used for increased absorption and more homogeneous light absorption in the laser medium. In this case, the bottom surface 4d of the laser medium 4 is coated for reflection of the pump light. If a homogeneous pump illumination across the laser medium top surface 4d is achieved, the heat flow will be substantially one-dimensional, as indicated in FIG. 7 by the arrows K.

If further the laser pump beam is substantially homogeneous throughout the laser medium volume, the heat flow will result in a substantially parabolic temperature increase along the vertical dimension V through the laser medium 4. Such a parabolic vertical temperature curve results in a parabolic and therefore substantially aberration-free vertical thermal lens, which has great advantages for the power scaling towards higher powers. A mounting and pumping concept similar to the one previously called the "thin disc laser" (A. Giessen, Stuttgart) may be used. The thin disc laser by A. Giessen achieves high pump densities in a thin disc of Nd:Vanadate or Yb:YAG, for example. The difference to that concept is that according to the invention the laser mode is operated transversely to the heat flow rather than parallel to the vertical dimension. If a (vertically) very thin laser medium is used, this results in an even smaller laser mode cross-section and therefore in higher small signal gain compared to the previous thin disc setup. The higher small signal gain can be used to build around this gain medium any kind of modelocking device or frequency conversion device as described throughout this invention. For example, stably modelocked lasers can be built using semiconductor saturable absorber mirrors or stably intracavity-converted continuous-wave lasers.

Figure 8B:
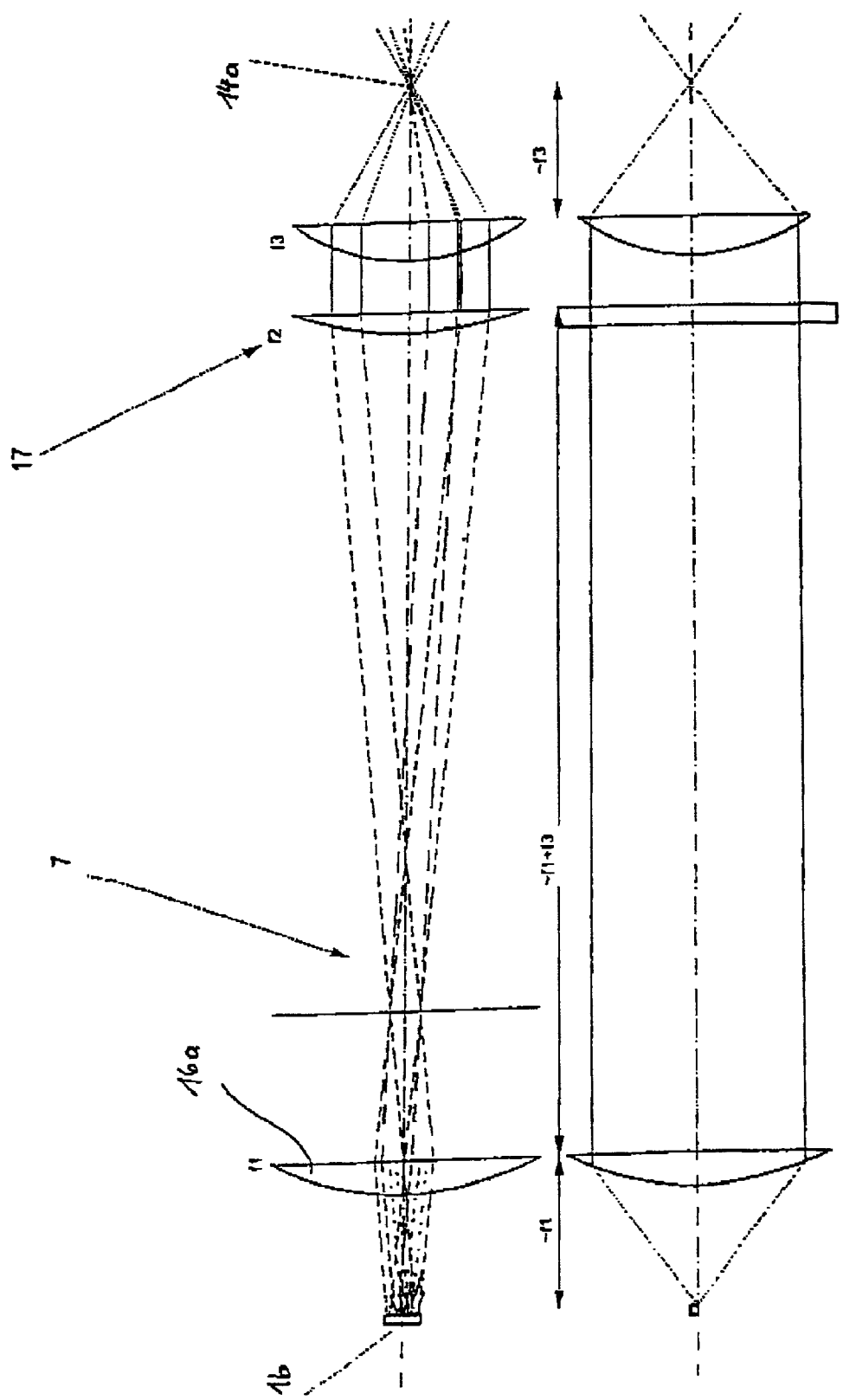
Figure 8D:
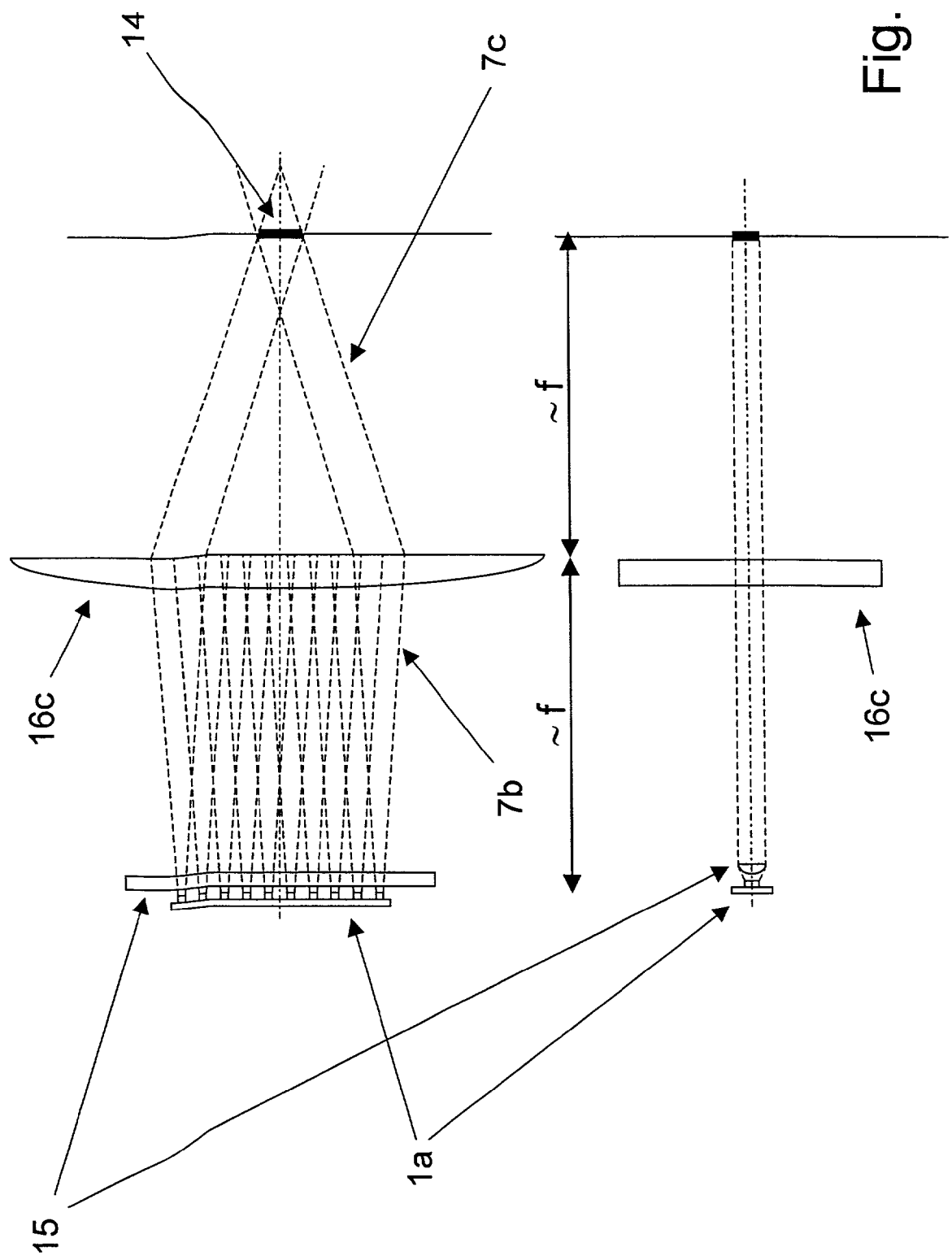

FIG. 8-A shows a laser diode imaging setup from the top and from the side which images the diode beam 7 from a diode array 1a into a substantially smooth spot 14. When a laser medium 4 is positioned at or close to the smooth spot obtained from such an imaging apparatus, the temperature profile resulting from absorbed power is also smooth, making fundamental mode operation easier and more efficient.

The diode laser array 1a according to FIG. 8-A may be a 5 mm wide array of 13 emitters placed on a single chip (DILAS GmbH, Mainz, Germany), each diode emitter being 200 μm wide and positioned at a 400 μm pitch. In the vertical axis, the emitting area is ca. 1 μm high. The vertical position of each diode emitter does not deviate by more than +/−0.5 μm from the horizontal plane, corresponding to a diode array "smile" of less than +/−0.5 μm. This high aspect ratio diode light propagates as shown in FIG. 8-A. In the horizontal plane (see top view) the diode light of each emitter propagates at a divergence of ca. +/−5°. In the vertical plane (see side view), the divergence can be as high as ca. +/−45°. Therefore, a short focal length cylindrical micro lens 15 with a focal length of ca. 0.2–1 mm is positioned at a distance equal to the focal length away from the diode array 1a, and collimates the vertical axis of the diode light 7a. A lens 16 with a focal length f is then placed ca. one focal length f away from the diode laser array 1. The lens 16 f then collimates each beam 7b in the horizontal plane and directs them to substantially the same spot (top view), and focuses the diode light in the vertical plane (side view). This results in a high aspect ratio diode laser beam 7c, where each diode array emitter is imaged substantially into the same (high aspect ratio) spot 14, resulting in a smooth intensity distribution. The spot 14 is smooth in a sense that even if some of the emitters of the diode array 1a die or degrade, the spot 14 will not substantially change its horizontal intensity pattern, because all emitters are imaged into the same spot 14. Both calculations and experiments show a high aspect ratio spot 14 with a diameter of 1–2 mm in the horizontal plane and 50–100 μm in the vertical plane.

The terms "horizontal" and "vertical" are defined by the specific setup of the diode array. In these examples the diode emitters are positioned horizontally in a linear array. Therefore the resulting beam has a cross section with an essentially horizontal scope. The examples do not limit the positioning of the emitters or the cross section of the beams to a horizontal setup. For a different orientation of the emitters, e.g. in a vertical linear array, the terms have to be adapted in an appropriate manner.

An alternative imaging setup is shown in FIG. 8-B from the top and from the side. Here the diode laser array 1b consists of 5 emitters, positioned at 0.2 mm pitch, each emitting from 100 μm (horizontal)×1 μm (vertical dimension). A lens 16a with a focal length of f1~4.5 mm is positioned ca. 4.5 mm away from the diode array 16a and collimates the vertical axis as well as the horizontal plane. Both directions do not significantly diverge over the following distance of ca. 24.5 mm, to a horizontal cylindrical lens 17 with a focal length of $f_2$=20 mm (in the horizontal plane only). A final focusing lens 18 with $f_3$=4.5 mm generates a spot 14a with strong ellipticity and a calculated diameter of ~200 μm×1 μm, assuming abberation-free imaging. Different lenses will result in different aspect ratios and spot diameters, and may be adapted to the needs of diode pumping of solid state lasers, for example following the guide lines given in D. Kopf et al, "1.1-W cw Cr:LiSAF laser pumped by a 1-cm diode array", Optics Letters, Jan. 15, 1997, Vol. 22, No. 2.

FIG. 8-C shows the principle of a third, alternative setup. Here a stack of 5 diode laser arrays 1c is used, each of which array 1c' is positioned on top of each other at a vertical pitch of ca. 1.75 mm. Each diode laser array 1c' is 1-cm wide and consists of 26 emitters, which are 200 μm wide and positioned at a 0.4 mm pitch (13 emitters shown in FIG. 8-C). Each array 1c' has a cylindrical micro lens 15b with a focal length of ca. 0.3 mm attached to itself, resulting in vertically collimated beams. Each diode laser array 1c' is imaged similar to the imaging shown in FIG. 8-A, using a lens 16b of focal length f=25 mm. In sum, all emitters of each diode laser array 1c' are imaged to substantially the same high aspect ratio spot 14b at a distance f away from the focal lens 16b f, resulting in a smooth high power, high aspect ratio pump spot 14b suitable for diode pumping. The laser diode stack 1c' generated up to 40 W per diode array 1c' and therefore a total of up to 200 W of optical power contained within a spot 14b of ca. 2.5 mm×0.2 mm, corresponding to an intensity of >10 kW/cm^2.

FIG. 8-D shows—only by way of example—a setup for pumping a laser source containing a regenerative amplifier or, alternatively, a single— or multi-pass amplifier. The principle of operation of a regenerative amplifier has been known for years. This laser setup uses an externally generated laser pulse that is coupled into the resonator by a suitable switch, e.g. a pockels cell, in passing state. Afterwards the state of the switch is changed to a non-passing state and the pulse is amplified during the subsequent roundtrips in the resonator. At its maximum amplification the pulse leaves the resonator by passing the switch that again is changed to the passing state. Common setups use end-pumped laser media with small focusing areas leading to high intensity pump spots. Therefore these setups typically have problems with thermal damages or internal inefficiencies due to beam distortion and diffraction losses.

The U.S. Pat. No. 5,541,951 discloses a device and method for high-power end pumping of a regenerative amplifier setup. The problems related to the high intensity spot are reduced by a pumping device, which is pulse activated for only approximately four hundred microseconds during each millisecond of operation. A disadvantage of this solution is the complexity of pulse generation and the still high intensity within the pump spot even if this intensity lasts only for a short period of time.

The pumping device of FIG. 8-D is similar to the setup of FIG. 8-A as described above but without any focusing. Again a short focal length cylindrical microlens 15 for collimation is placed in close distance to each diode emitter of the diode array 1a. Contrary to the setup of FIG. 8-A the lens 16c is a cylindrical lens, which collimates each beam 7b in the horizontal plane and directs each beam 7b to substantially the same spot (top view) without a focusing of the diode light in the vertical plane (side view). Due to the lack of focusing this results in a comparatively lower aspect ratio diode laser beam 7c with a comparatively low intensity, which prevents thermal damages and other problems caused by higher intensities in the regenerative amplifier setup.

The pump spot pumps a laser crystal which by way of example can be a flat-Brewster-cut crystal, which is coated on the flat side (entrance face for pump light) for high reflectivity at the laser mode wavelength and for high transmission at the pump wavelength, and uncoated or antireflection coated for protection on the Brewster face.

Figure 10:
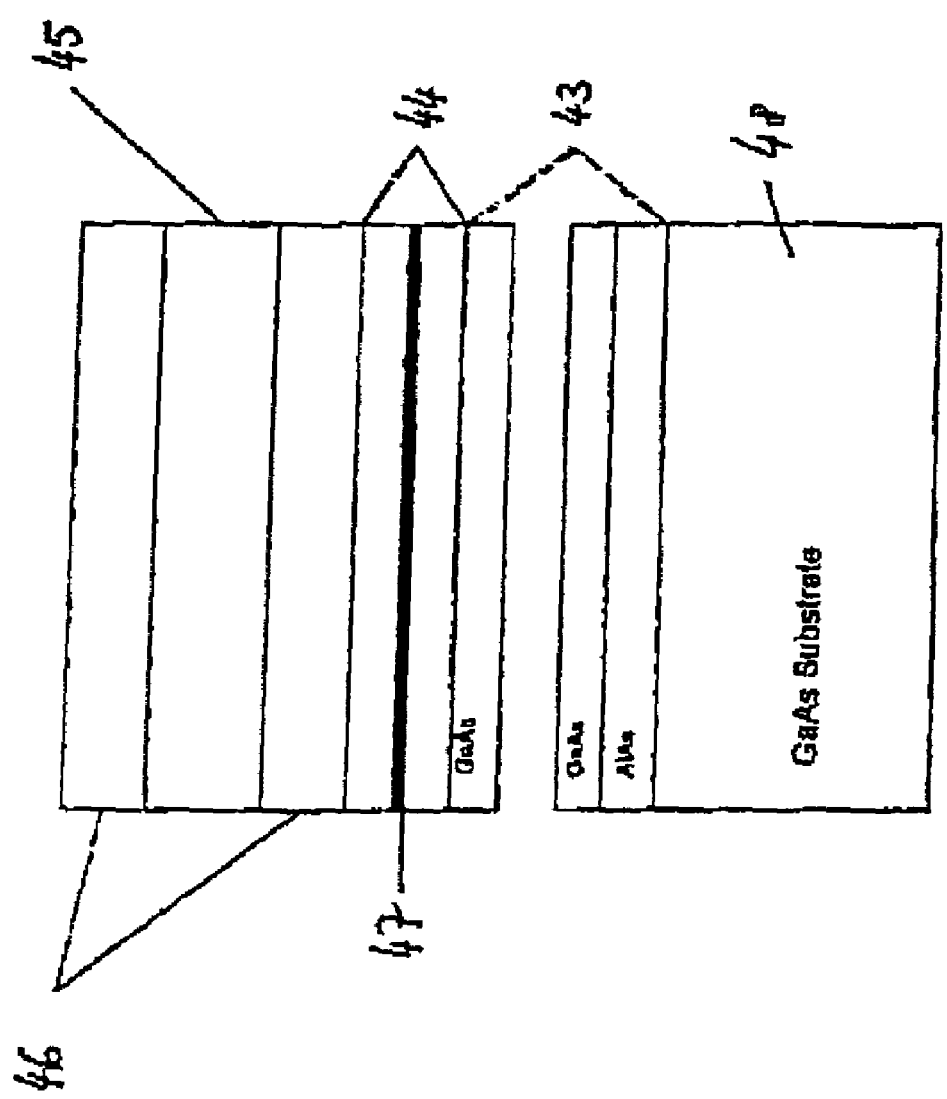
FIG. 10 depicts a cross-sectional view of a semiconductor absorber component used as optical component in the embodiments according to FIG. 9a–9c.

FIG. 9-A shows a complete laser setup, with a pump arrangement 19 as described above, and a laser cavity 4,20,21,22 which has a high aspect ratio fundamental beam cross-section substantially matched to the high aspect ratio diode pump beam at the laser medium. As the laser medium 4 0.4%-Neodymium-doped Yttrium-Vanadate (Nd:YVO4) with a coating on one side and a Brewster face at the other side may be used. The coated side has for instance a reflectivity of R=95% for the laser wavelength of 1064 nm and a high transmission T>90% for the pump light at a wavelength of 808 nm. A dichroic mirror 31 placed between the diode laser focusing lens and the laser medium entrance face separates the 1064 nm laser output from the incoming 808 nm pump light. A first cavity mirror 20 has a vertical (i.e. perpendicular to plane of drawing) curvature with a radius of 65 mm, and is highly reflective for 1064 nm. A second cavity mirror 21 has a spherical radius of curvature of 200 mm. The distance betweeN the two mirrors is about 280 mm. As optical component 22 a semiconductor saturable absorber component is used as shown in FIG. 10. It is positioned as a distance of about 100 mm form the second cavity mirror. This component is responsible for modelocking and generates a train of picosecond pulses at an average output power of ca. 3 W average power and a pulse repetition rate of ca. 360 MHz. Therefore, this laser setup is suitable for building high repetition rate (>250 MHz) ultrashort pulse lasers with multiple Watt output power.

FIG. 10 shows an example of such a semiconductor saturable absorber, representing the layers along the surface normal to its surface. Firstly, 30 pairs of layers of alternating gallium arsenide (GaAs) and aluminium arsenide (AlAs) layers 43 each with an optical thickness corresponding to a quarter wavelength are applied onto a gallium arsenide (GaAs) substrate 48. This can be achieved with the help of the growth process of the molecular beam epitaxy (MBE). However, other epitaxy processes known and usual in this field are also suitable. The GaAs/AlAs pairs of layers are transparent for the laser wavelength of 1064 nm and result, in the example depicted in FIG. 10, in a Bragg mirrorlike coating structure with a high reflection factor close to 100% with a wavelength of 1064 nm if the thickness of GaAs is selected at approx. 72.3 nm and that of AlAs at approx. 88 nm, each corresponding to about an optical quarter wavelength. Then a further GaAs layer 44 integrating an approx. 10 nm thin absorber layer of the material indium gallium arsenide (InGaAs) is assembled onto this standard GaAs/AlAs Bragg mirror structure. The optical total thickness of this GaAs layer with integrated absorber layer 47 corresponds to half a wavelength, that is the physical film thickness is approx. 145 nm. The indium content of the absorber layer 47 is determined so that an absorption is obtained at the laser wavelength of 1064 nm, that is the band-edge is approx. 1064 nm or a few 10 nm higher than the laser wavelength, e.g. at 1064–1084 nm. This corresponds to an indium content of about 25 percent. With higher intensity and pulse energy density, a saturation of the absorption of this absorber layer 47 occurs, i.e. it is lower. In the case of particularly thin layers of less than 20 nm thickness, by additionally finely adjusting the indium content the exciton peak near the band edge, generated by the exciton absorption behaviour of thin layers to be quantizised, can be adjusted exactly to the laser wavelength, resulting again in an even more pronounced saturable absorption at this wavelength. Finally, another three dielectric pairs of layers transparent for the layer wavelength are applied, beginning with that layer 45 having a higher index of refraction n=2.02 and continuing with that layer 46 having a lower index of refraction of 1.449 at a wavelength of 1064 nm. The process of electron beam coating widespread in the optical coating field is suitable to achieve this. Other optical coating processes, such as for example ion beam sputtering, are also suitable and can have the advantage of resulting in lower losses. As optical layer materials, those with an index of refraction of 1.449 and 2.02 at a wavelength of 1064 nm were used. However, a large number of other materials can be used as long as adhesion to GaAs and transparency at the laser wavelength are ensured.

By expanding the laser resonator of FIG. 9-A while keeping the mode cross-section at the laser medium approximately constant, it is possible to build a 80 MHz modelocked laser resonator using a semiconductor saturable absorber mirror. The laser will generate up to 6 W of modelocked output power at an absorbed pump power of 15 W. The modelocking threshold measured is at an output power as low as 0.82 W. Throughout the modelocked operating range, the pulse energy density incident on the semiconductor saturable absorber mirror is not higher than 10 times the saturation pulse energy of the optical component, which is sufficiently low to avoid optical damage or long-term degradation effects. The pulse energy density of the saturable absorber layer is as low as 0.5 mJ/cm$^2$ or even less. The laser concept described here therefore allows to build simple, high-power and long-term stable ultrashort pulse lasers.

As an example: A 0.3%-doped Nd:Vanadate crystal, mounted according to FIG. 6 and with a cross-section of ca. 4 mm×0.8 mm, was pumped by a laser diode array emitting 40 W and being imaged into that crystal accoring to FIG. 8a using a cylindrical micro-lens with a 0.4-mm focal length and a lens doublet f with a focal length of approximately 15 mm. A laser cavity similar to that of FIG. 9a was arranged such that at the laser medium a lasing mode of approximately 1.3 mm×0.07 mm was obtained, showing an aspect ratio close to 20:1. The laser cavity end was a semiconductor saturable absorber mirror generating stable picosecond modelocked pulses with an average output power >8W. The laser was operating in the fundamental mode. This example shows that this invention can be used for Nb:Vanadate laser media operating at high power without being prone to fracture.

As an alternative setup, FIG. 9-B shows a similar laser setup where a cylindrical lens 20a is incorporated in the laser cavity instead of the first cavity mirror 20. Such a cylindrical lens may also be provided instead of the second cavity mirror 21. The lens can be anti-reflection coated at the laser wavelength for minimized reflection losses. The cylindrical lens 20a can also be inserted at Brewster's angle, which can minimize insertion losses when the lens is uncoated, for example. A man skilled in the art will choose additional optical elements according to different resonator lengths or different laser mode sizes.

Figure 11B:
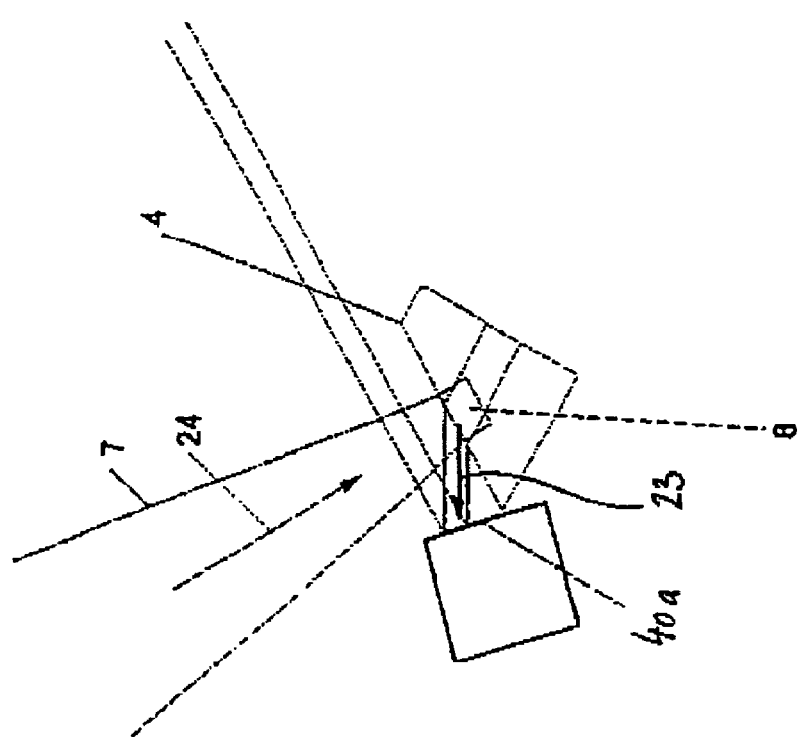
Figure 11A:
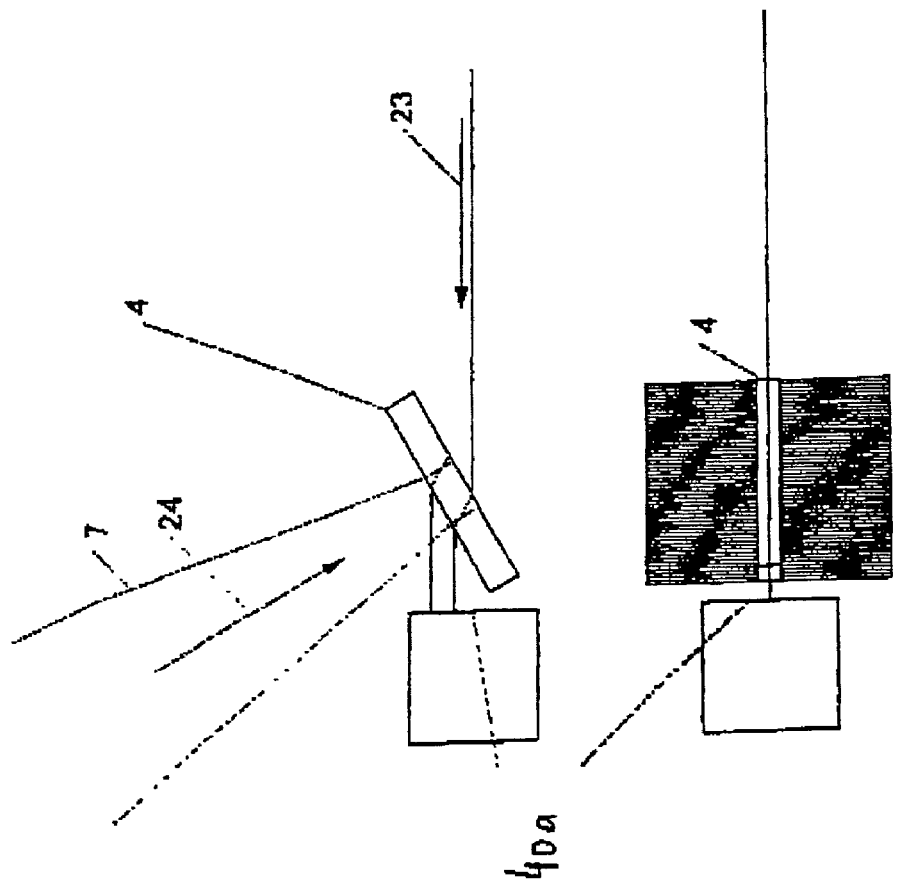
FIG. 11a shows a diode pumping setup from the top and the side, the axis of the pump beam being oblique to the axis of the laser mode.

FIG. 11a shows a diode pumping setup from the top and from the side where the elliptical pump spot 14 does not enter the laser medium 4 along the same optical axis 24 as the laser 4 mode optical axis 23, in contrast to the previously described setups. The laser medium is inserted at Brewster's angle with respect to the laser mode optical axis 23. The pump light 7, however, enters the laser medium from the side, approximately perpendicular to the laser medium Brewster face 4e. This setup can have a number of advantages: The laser light does not have to pass through one of the laser cavity mirrors (as 40a) and therefore does not impose potentially difficult requirements on that coating, which would usually have to be optimized for high transmission at the pump light. This can simplify the constraints on the coating, in particular when the pump laser wavelength is close to the laser wavelength, such as for example when pumping Ytterbium-doped YAG at 940 nm and operating the laser cavity at 1030 nm. With regard to the other parts, the cavity can still be substantially the same as that of FIG. 9, which results in a high aspect ratio fundamental beam at the laser medium. The laser diode pump beam can then also be a high aspect ratio beam at the laser medium when using, for example, one of the diode imaging setups shown here. With such a setup, for instance, a 940 nm diode pumped Yb:YAG laser may be operated producing >2.3 W output power at an absorbed pump power of ~25 W.

FIG. 11b shows an alternative diode pumping setup from the top, where, similar to the setup shown in FIG. 11a, the optical axis of the elliptical pump spot generating beam 7 and the axis of the laser mode do not coincide. Here the laser crystal is coated with a reflective coating for the laser wavelength at the back side, thereby operating as laser resonator end. For laser crystals sufficiently short along the axis of the laser mode, this results in a pump absorption region 8 being close to the resonator end, which can be exploited for spatial hole burning, thereby obtaining shorter optical pulses.

Beam axis adjustment for the light beam emerging from the diode array: The imaging optics of known laser means as for example described in „1.1-W cw Cr:LiSAF laser pumped by a 1-cm diode array", D. Kopf, U. Keller, M. A. Emanuel, R. J. Beach and J. A. Skidmore; Optics Letters, Jan. 15, 1997, Vol. 22, No. 2 comprise several optical elements, which have to be mounted at precise positions along the path of the light beam from the diode array to the laser medium. These optics extend over a long distance and do need a big space. The laser diode usually emits from an emitting area which is 1 μm (micrometer) in vertical direction and typically 3 μm up to 10'000 μm in horizontal direction. Laser diodes with an emitting area which is 3 μm wide typically emit laser light which is diffraction limited and carries approximately 50–300 mW power. Laser diodes with a 10'000 μm wide emitting area on a single chip emit laser light with output powers in the range of 20–60 W. The laser light is in the vertical dimension nearly diffraction limited but is not diffraction limited in the horizontal dimension (approximately 2000 times higher). The high power diode "bars" usually consist of an array of diodes located on the same chip: For example, a 40 W laser diode may consist of an array of 20 diodes each with a 200 μm wide stripe and a center-to-center spacing of 400 μm. In this case the fill factor is 50% corresponding to the active area divided by the total area, which also includes the inactive spacer area in between two adjacent diodes on the same chip or "bar".

The light from the laser diode is typically strongly diverging in the vertical axis ("fast" axis) at an angle of approximately +/−30°, for example. Therefore, the first optics component in the imaging optics is a fast-axis collimation lens, preferably a cylindrical lens, which collects the light in the vertical dimension. This lens is normally attached to the same mount on which also the laser diode chip ("bar") is mounted. In some cases, it is not necessary to use a cylindrical lens, especially as long as the emitting area aspect ratio is not much higher than 500 μm: 1 μm (horizontal dimension:vertical dimension). Generally it is preferable to use high numerical aperture (NA=0.5 approximately) lenses which are capable of collecting all or substantially all power in the vertical dimension, where the divergence is generally much higher than in the other dimension.

One issue of importance is the so-called "smile" of a laser diode array. The smile relates to a bending of the laser diode array in the vertical dimension. This bending is typically in the order of one or a few microns across a 5'000 μm or 10'000 μm diode bar. The result is that the discrete emitting areas on the same chip have different vertical positions with respect to the cylindrical fast-axis collimation (FAC) lens. For a change in vertical position in the order of 1 μm across the bar, the beam angle after the collimation lens is changed by 1/200=5 milli radians. This is approximately equal to the full-angle divergence of the diffraction-limited beam exiting the FAC lens, which is the divergence that would be expected with no smile and no aberrations from the FAC lens. Therefore, any smile greater than 1 μm across the bar would be the predominant reason for increased beam divergence and, correspondingly, reduced beam quality after the FAC lens, and is therefore to be avoided as much as possible.

Likewise, any misalignment of the FAC lens on the order of 1 μm in the vertical dimension results in the same angle deviation. Therefore, the FAC lens would have to be mounted with a tolerance of less than 1 μm. This is difficult and/or costly. To reduce this cost and to make the mounting procedure of the FAC lens to the diode mount less critical, any beam angle tolerances, respectively orientation tolerance of the beam axis, after the FAC lens in the order of +/−10 milli radians in the vertical dimension are acceptable. This leaves the FAC mounting procedure with an acceptable tolerance of +/−2 μm for the vertical position A preferred configuration should enable a precisely oriented diode array beam by simple optics. The described mounting procedure tolerance should not cause an unacceptable deviation of the diode array beam form its precise orientation.

FIGS. 12a, 12b, 12c and 12d show sketches of possible configurations. In a particular embodiment a laser diode array 1 with a total width of 5'000 μm and an emitted power of 15 W at a wavelength of 808 nm and a cylindrical collimation lens 2 with a focal length of approximately 200 μm in the vertical dimension are used. The diode array 1 and preferably also the collimation lens 2 are fixed to the diode array mount 3. Therefore the mentioned orientation tolerance of the beam axis is a tolerance of the beam axis relative to the diode array mount 3. In order to compensate for any beam angle deviation within the range of approximately +/−10 milli radians, a wedged window is used. A wedge in the order of 0.5° (=8.7 milli radians) results in a maximum angle correction of the refractive index of the window material times the wedge angle, which results in an angle correction of up to 1.5* 8.7 milli radians=13 milli radians. Upon rotation of the wedged window through the range of 180° around its normal axis, the resulting vertical angle correction correspondingly changes within the range of ±13 milli radians and can therefore compensate for any vertical angle deviation the beam may have after exiting the FAC lens 2. This adjusting is used to post-compensate the vertical angle deviation in a simple and insensitive way according to the illustration in FIG. 12a, where the angles (wedge and beam angles) are exaggerated by a factor of 10 for illustration purposes.

The vertical angle compensation, respectively adjusting the beam axis into a horizontal plane, results in a change in angle in the horizontal plane. However, this does not result in a significant relative change of the horizontal angle because the divergence of the laser diode light in the horizontal plane is on the order of +/−6° (=ca. +/−100 milli radians). Therefore, a change in angle in the horizontal plane can be neglected.

Figure 12B:
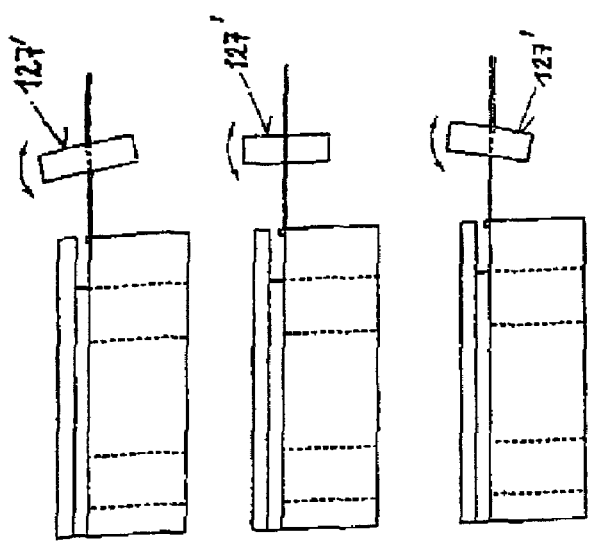
FIG. 12a, 12b, 12c and 12d show schematic side views of the diode pumping set-up with a window for adjusting the light beam.
Figure 12D:
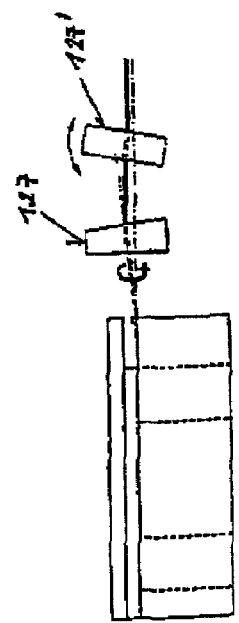
Figure 12A:
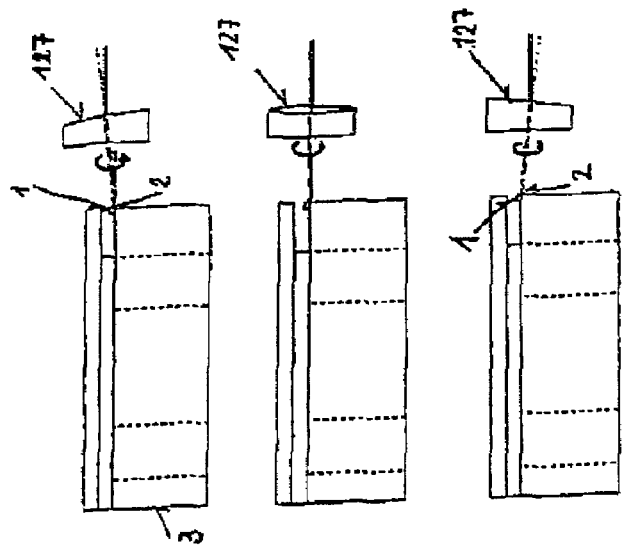
Figure 12C:
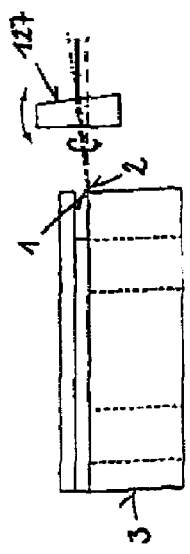

The vertical beam offset which comes along with the vertical angle compensation can be compensated for by another rotation of the same or an additional window with a rotation axis aslant to the beam axis. This is shown in FIGS. 12b, 12c, 12d. FIG. 12b shows a parallel window 127' with parallel surfaces. Assuming a window thickness of 2 mm and a refractive index of 1.5, a rotation by an angle of 1° results in a vertical beam offset, respectively shift, of approximately 23 microns, which is much less than the vertical beam width of 200 µm in our example. A parallel window 127' with a smaller thickness would have to be rotated by a higher angel to cause the same vertical beam offset. Therefore the adjusting with thin parallel windows 127' is not delicate at all.

According to FIG. 12c the wedged window 127 can be rotated around two axes which allows adjusting of both the vertical beam angle and the vertical beam offset in an insensitive way. FIG. 12d shows an alternative, where two separate windows in combination can do the same job. The wedged window 127 is used to compensate for the beam angle deviation and the parallel window 127' is used to compensate for the beam offset.

Figure 13A:
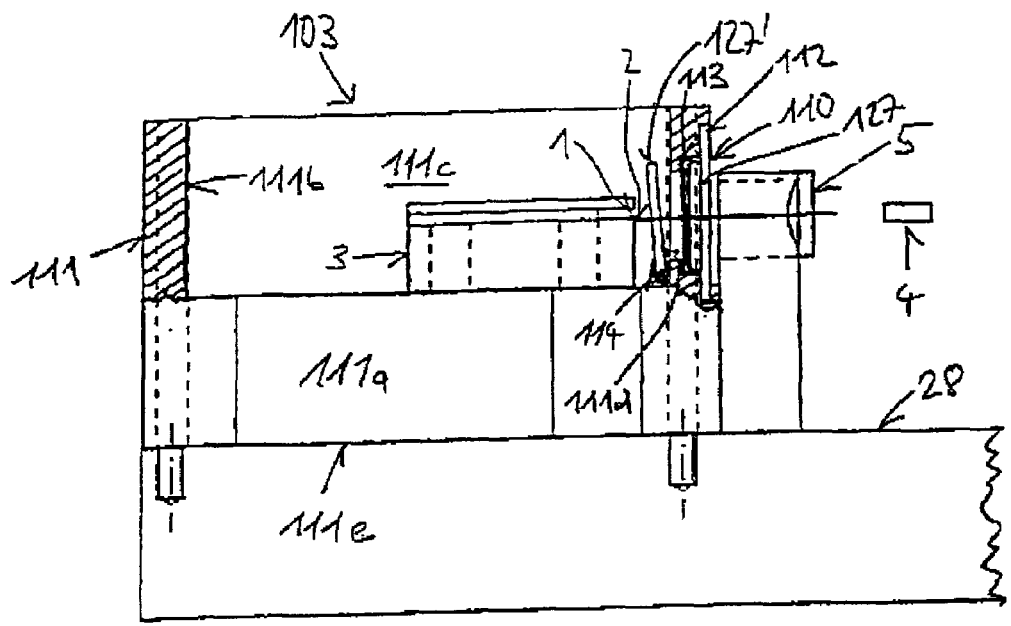
FIG. 13a and 13b show side and top views, respectively, of a diode array pumping device on a laser system base with partially cut areas.
Figure 13B:
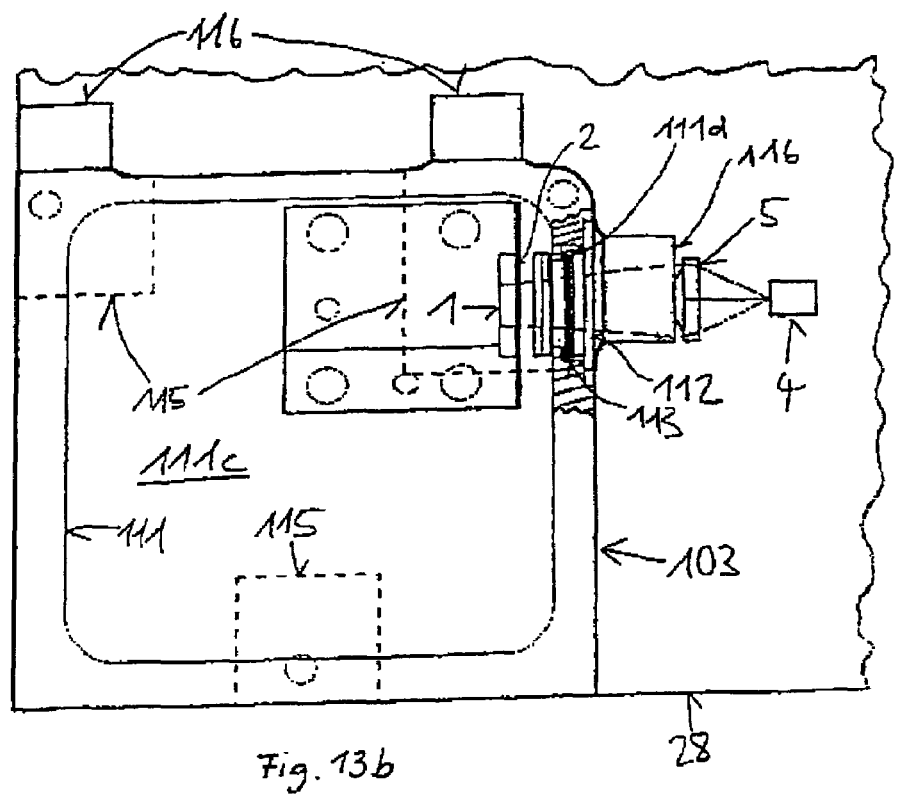

At least one wedged window 127 is part of an adjusting means which enables adjusting the light beam, respectively its axis, to a defined plane or axis relative to the diode array mount 3. According to FIGS. 13a and 13b an embodiment of a diode array pumping device 103 comprises the diode array mount 3, the diode array 1, the collimation lens 2 and adjusting means 110. The adjusting means 110 includes at least one wedged window 127. In the shown embodiment the adjusting means 110 includes a parallel window 127' as well. The windows 127 and 127' are arranged at an opening 111d through a side wall 111b of a cuplike pumping device mounting frame 111. The mounting frame 111 has a bottom plate 111a and side walls 111b enclosing an inner space 111c, which can be closed by a cover plate. The diode array mount 3 is arranged within the inner space 111c close to a side wall 111b in such a way that the light beam of the diode array 1 is passing through the opening 111d. The edge of the opening 111d has preferably at least two steps. The wedged window 127 is arranged in-between an elastic ring 113 and a holding ring 112, wherein the elastic ring 113 and the wedged window 127 are pressed by the holding ring 112 towards a first step of the opening 111d. For adjusting the axis of the diode light beam to a horizontal plane, respectively to a plane parallel to a lower contact plane 111e of the mounting frame 111, the wedged window 127 is turned around its normal axis. The holding ring 112 is fixed to a second step of the opening 111d. The parallel window 127' is arranged in-between the diode array 1 and the wedged window 127. After tilting of the parallel window 127' until the vertical offset of the beam axis is compensated, the parallel window 127' is fixed to the mounting frame 111. Since the parallel window 127' is light and the tilting angle does not have to be very accurate, the fixing can be done with a spot of adhesive 114. After adjusting the axis of the diode light beam into a plane at a defined distance and parallel to the contact plane 111e, the diode array pumping device 103 can be fixed to the laser system base 28.

The adjusting means 110 is very simple and enables a precise orientation of the diode array beam by a an easy adjusting step at the production of the diode array pumping device 103. The diode array pumping device 103 and the adjusting means 110 is new and inventive independent of the other scopes of this invention.

The optics on the diode array pumping device 103 is designed such that the connecting of the pumping device mounting frame 111 to the laser system base 28 is insensitive to angle and position deviation that may occur from one diode array pumping device 103 to the other diode array pumping device 103 upon replacement. Typical repositioning tolerances of the diode array pumping device 103 on the laser system base 28 are in the order of a few microns, corresponding to the achievable flatness in the order of a few microns for machined surfaces. This results in well acceptable changes in beam direction and offset at the laser medium and therefore does not significantly affect the laser system performance.

For the purpose of focusing the diode laser light into the laser medium, an f=8 mm focal length lens 5 with high NA and good imaging quality, for example the item number C240TM-B from Thorlabs, Inc., can be used. This lens 5 is preferably no longer part of the diode array pumping device 103, but is attached to the laser system base 28 where also the laser medium 4 is positioned.

Figure 14:
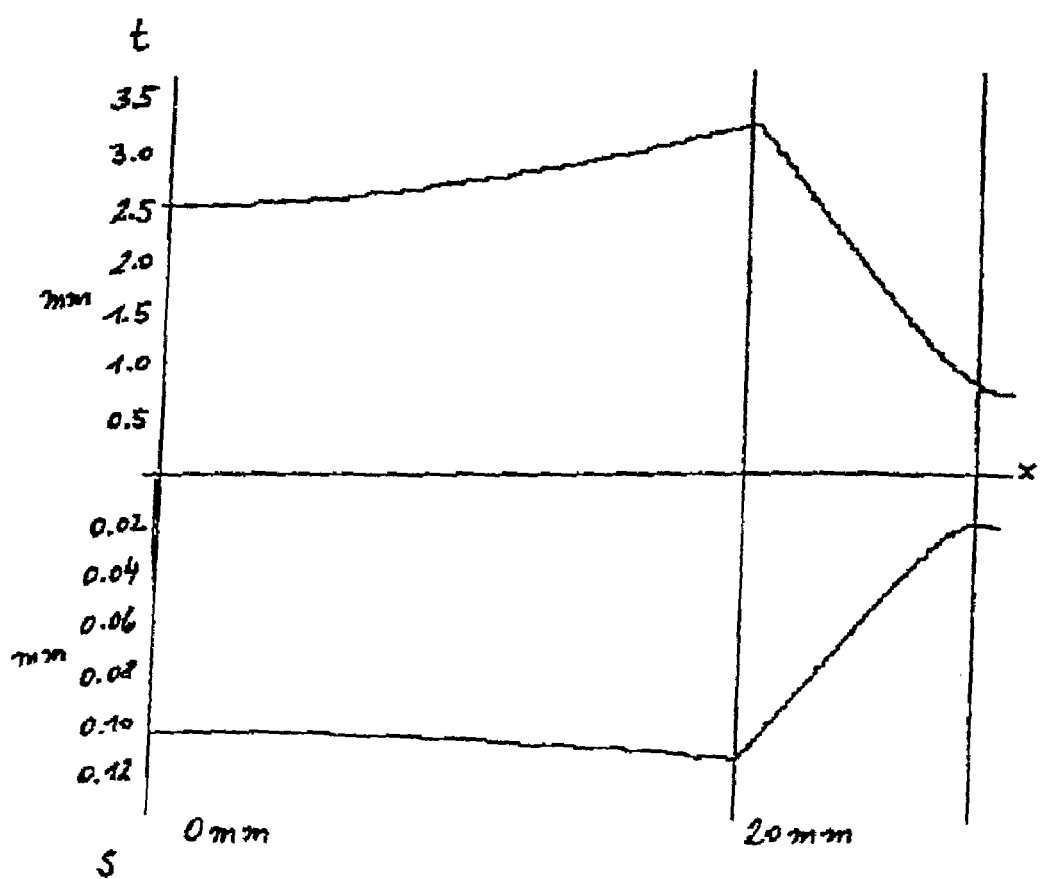
FIG. 14 shows tangential (t) and sagittal (s) extension of the light beam along its axis (x) from the diode array to the laser medium.

The focusing optics described here generates a bright and highly asymmetric pump beam inside the laser medium, as can be seen from the beam propagation plot in FIG. 14: The x-axis shows the beam propagation from diode array 1 (left) to the laser medium 4 (right), where the focal lens 5 is positioned at x=20 mm. Assuming no aberrations and no smile, than the calculated focus has a waist of 740 µm in the horizontal direction and of 22 µm in the vertical direction and is therefore highly asymmetric and bright. The horizontal respectively vertical direction is shown in the direction of the tangential- (t), respectively sagittal-axis (s). The pump beam obtained from the scheme described here is well suited for building a laser cavity with a vertically squeezed laser mode inside the laser medium. This is described in more detail in D. Kopf, K. J. Weingarten, G. Zhang, M. Moser, A. Prasad, M. A. Emanuel, R. J. Beach, J. A. Skidmore, U. Keller, Invited Paper, "High-average-power diode-pumped femtosecond Cr:LiSAF lasers," Applied Physics B, vol. 65, pp. 235–243, 1997.

At the laser medium, one can assume an acceptable relative tolerance of +/−10% for both the diode laser beam angle and position with respect to the diode laser beam divergence and width. Given a half-angle vertical beam divergence of 10 milli radians and a beam waist of 20 microns radius at the laser medium, this corresponds to a desired pump beam reproducibility of +/−1 milli radian in angle and +/−2 microns in position at the laser medium. In a distance of 8 mm (focal length) before the f=8 mm focusing lens, any angle deviation results in a position deviation at the laser medium, and vice versa. Therefore, the requested beam angle and position reproducibility at the diode array pumping device 103 exit is calculated to be 8 µm and 0.25 milli radians, respectively. For typical machining accuracies in the order of a few microns this should be easy to accomplish: Given a surface flatness of 5 µm across the diode array pumping device 103 base dimension of approximately 60 mm (FIG. 13a, 13b), one can achieve a position and angle reproducibility of 5 μm and 5 μm/60'000 μm=0.1 milli radian. In order to even enhance this reproducibility, the bottom of the pumping device mounting frame 111 can be machined such that only three defined horizontal positioning areas 115 touch the laser system base 28 in a predetermined way. The horizontal alignment of the pumping device mounting frame 111 with respect to the laser system base 28 is for example accomplished by three distinguished vertical positioning areas 116.

The example given here is not restricted to the given values. For an ordinarily skilled person it would be obvious how to adapt the set-up described here to different focal lengths, dimensions, number and types of optics elements, etc. For example, the fast-axis collimation lens 2, which had a focal length of 200 μm in this description, can have a different focal length, too. For this purpose, fast-axis collimation lenses with a focal length in the range from 50 μm to 1000 μm are common and often used, but the scope of this invention is not restricted to these values. The fast-axis collimation lens 2 does not necessarily have to be mounted on the same mount as the diode bar is mounted on, but may as well be fixed to the pumping device mounting frame 111.

Likewise, the beam path may contain another lens or focusing means, such as for example a second cylindrical lens for shaping the beam in the horizontal plane. The wedged window 127 does not necessarily have to have flat surfaces but can fulfil substantially the same function when its surfaces are curved. Note that, for example, an off-axis spherical or cylindrical lens could be used for basically the same purpose as the wedged window 127, since the front and back surface are also at an angle with respect to each other. As an alternative, the wedged window 127 can also be replaced by prism which fulfils still substantially the same function as the wedged window because its surfaces are also at an angle with respect to each other.

The diode array pumping device 103 is a module that can be replaced without affecting the laser performance. Such a user-replaceable diode module would increase the laser life time of diode-pumped lasers because the user can replace the diode module himself and therefore no service personnel is needed. Since typical laser diodes only live for approximately 10'000 hours (mean time to failure), the user-replaceable diode module boosts conveniently the laser system lifetime up to multiple laser diode lives, which is sufficient for industrial laser applications. Likewise, solid state lasers which use less reliable laser diodes, for example high power red diodes with a live time of about 2.000 hours, can still become attractive when using the possibility of easy diode module replacement.

Up to now diode-pumped solid state lasers do not use any concept which aims at easy replacement of the laser diodes. Here, the disadvantage is that only skilled personnel at the laser factory can do the replacement. Other laser manufacturers have focussed on fiber-delivery of the laser diode light from diode modules, which then can easily be replaced by an experienced engineer ("field-replaceable"). However, this approach suffers from loss of brightness and beam quality through the optical fiber, from higher complexity and an increased number of optical elements. Additionally, the field-replaceable diode modules do not yet fulfil the criterion of being user replaceable.

It is therefore an important advantage of the described embodiment with a replaceable diode array pumping device 103, that the laser diode and part of the imaging optics is put on a removable optics basis for quick, simple, and reproducible replacement. The optics on the diode module is designed such that after replacement of that module, both the angle sensitivity and the positioning sensitivity is low enough to make sure that the laser still works. The diode module optics contains at least one piece of optics which allows very easy (i.e. insensitive) adjustments of the output beam characteristics, which makes the diode module assembly procedure insensitive and reproducible.

Figure 15:
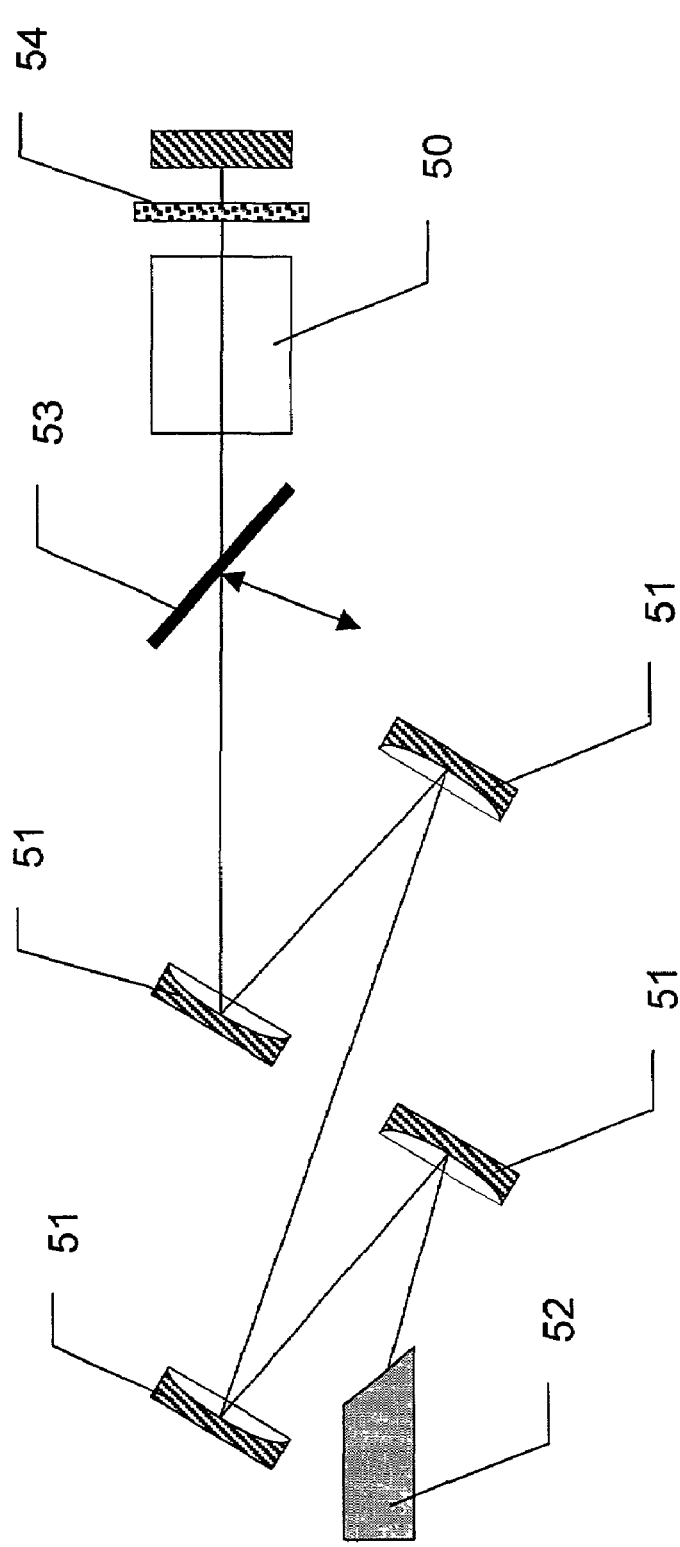
FIG. 15 shows a schematic view of a setup with a diode array pumping device and a regenerative amplifier laser system.

FIG. 15 shows as an example the schematic setup of a regenerative amplifier used with a laser means for producing an appropriate pump light beam. A polarized laser pulse from a seed laser source is coupled into the setup by a polarizer 53 and is reflected by a mirror 51' after passing a pockels cell 50 and a quarter-wave plate 54. In dependence of the voltage applied to the pockels cell 50 the polarization of the laser beam is rotated so as to enable the laser beam to pass through polarizer 53 and to enter the cavity or to leave the setup. If the pulse is held in the setup the laser beam is amplified in the laser medium 52 during each roundtrip after multiple reflection by, in this example four, mirrors 51. After subsequent roundtrips necessary for reaching maximum amplification the laser beam is coupled out of the setup by the polarizer 53 after another rotation of the polarization by the pockels cell 50.

The invention claimed is:

1. A laser means for producing an elliptical high aspect ratio spot, comprising:
    a diode pumping array with a plurality of emitters, wherein at least two of the emitters, each emitting a partial beam, are mounted in a horizontal array; and
    optical means for producing a pump beam by imaging each single emitter into a same spot, wherein said optical means further includes:
        an upstream optical means to collimate said partial beam in a vertical plane, and
        a downstream optical means to collimate said partial beam in a horizontal plane, focus said partial beam in the vertical plane, and direct said partial beam to said spot, whereby images of said emitters in said spot form a smooth spot by an overlap of said images in a sense that if some of said emitters die or degrade, said spot will not substantially change a spot intensity pattern.

2. A laser means for producing an elliptical high aspect ratio spot, comprising:
    a pumping array with a plurality of emitters wherein at least two of the emitters, each emitting a partial beam, are mounted on a horizontal array; and
    optical means for producing a pump beam by directing each partial beam to a same spot as a partial beam that is collimated in at least one plane, wherein the optical means further includes:
        a first cylindrical lens for collimating the strongly divergent pump light of said partial beam, wherein said first cylindrical lens is positioned nearby said emitters at a distance corresponding to the focal length of the first cylindrical lens; and
        a first lens for collimating said partial beam in a horizontal plane and focusing said partial beam in a vertical plane and directing said partial beam to said spot, wherein said first lens is positioned at a distance away from the diode pumping array corresponding to the focal length of the first lens.

3. A laser means for producing an elliptical high aspect ratio spot, comprising:
    a diode pumping array with a plurality of emitters, wherein at least two of the emitters, each emitting a partial beam, are mounted in a horizontal array; and optical means for producing a pump beam by directing each partial beam to a same spot as a partial beam that is collimated in at least one plane, wherein said optical means includes:
a first cylindrical lens for collimating a strongly divergent emission of an emitter into a beam in a first plane, wherein said first cylindrical lens is positioned near the diode array at a distance corresponding to the focal length of the first cylindrical lens, and
a second cylindrical lens for collimating said beam wherein said second cylindrical lens is positioned at a distance from the diode pumping array corresponding to the focal length of the second cylindrical lens.

4. A laser means as in claim 3, wherein said second cylindrical lens collimates said beam into a collimated beam in a second plane perpendicular to the first plane.

5. The laser means as in claim 4, wherein said second cylindrical lens directs a plurality of said collimated beams to substantially a same spot.

6. The laser means as in claim 1, wherein said diode pumping array is held by a diode array mount and wherein said optical means comprises adjusting means for adjusting the axis of the pump light beam to a defined plane relative to the diode array mount, which adjusting means includes at least one wedged window.

7. The laser means as in claim 6, wherein said diode array, said diode array mount, said first cylindrical lens is positioned nearby the diode array, preferably at the diode array mount, and said adjusting means are fixed to a laser system base.

8. The laser means as in claim 7, wherein said adjusting means further comprises at least one parallel window.

9. The laser means as in claim 8, further comprising a mounting frame for holding said diode array mount and said at least one parallel window wherein said mounting frame has a contact plane for fixing said mounting frame to said laser system base.

10. The laser means as in claim 9, wherein said pumping device mounting frame has a side wall with an opening at which said at least one parallel window is arranged.

11. The laser means as in claim 9, wherein the pumping device mounting frame comprises three horizontal positioning areas and preferably three vertical positioning areas for mounting diode array pumping device at the laser system base in a defined position.

12. The laser means as claim 1, wherein said optical means comprises: a first lens for collimating said partial beam in the vertical and in the horizontal plane and directing the partial beam to said spot, the first lens being positioned at a distance away from the diode pumping array corresponding to a focal length of a cylindrical lens positioned at a distance away from the diode pumping array corresponding to a sum of a focal length of the first cylindrical lens and of twice the focal length of the first lens; and a focusing lens for collimating said partial beam in a first plane and for focusing the pump light beam in a second plane perpendicular to the first plane.

13. The laser means as in claim 1, wherein said diode pumping array comprises a laser diode bar generating said partial beams which are combined to a pump light beam.

14. The laser means as in claim 1 with an aspect ratio for the pump beam of>15:1.

15. The diode-pumped laser operating in the fundamental mode, comprising:
a laser means according to claim 1; and
a solid state laser medium which is excited by said laser means.

16. The diode-pumped laser as in claim 15, wherein the cross-section of said elliptical beam spot has an aspect ratio of>3:1.

17. The diode-pumped laser as in claim 15, wherein the thermal profile of the laser medium is smooth and enables fundamental mode laser operation.

18. The diode-pumped laser as in claim 15, wherein the laser mode is strongly elliptical within said laser medium.

19. The diode-pumped laser as in claim 18, wherein the aspect ratio for the laser mode is>5:1.

20. The diode-pumped laser as in claim 15, comprising cavity-forming means, whereby a reflective cavity element closest to an entrance face of said laser medium is not in direct contact with said entrance face.

21. The diode-pumped laser as in claim 15, wherein the axis of said pump beam is positioned obliquely or even vertically to the axis of the laser mode.

22. The diode-pumped laser as in claim 15, wherein said laser medium comprises Nd:Vanadate.

23. The diode-pumped laser as in claim 15, further comprising a semiconductor saturable absorber for obtaining a stable modelocked average output power of several Watts.

24. The diode-pumped laser as in claim 23, where stable modelocked operation is obtained at a pulse energy density on the semiconductor saturable absorber which is lower than 10 times a saturation energy density of said semiconductor saturable absorber.

25. The diode-pumped laser as in claim 23, where stable modelocked operation is obtained at a pulse energy density on the semiconductor saturable absorber which is lower than 0.5 mJ/cm$^2$.

26. A diode-pumped laser with a laser means as in claim 3, comprising at least one of a single-pass amplifier, a multi-pass amplifier and a regenerative amplifier setup configured to generate at least one of micro-Joule- and milli-Joule-level laser pulse energies.

27. A solid state laser medium excited by a laser means according to claim 1 that is partly supported in at least two first regions contacting thermally conducting material, and with at least two second regions adjacent to said first regions, the surface of said second regions contacting material with low thermally conductivity.

28. The solid state laser medium according to claim 27, wherein the contact to said thermally conducting material is enhanced by a contacting medium.

29. The solid state laser medium according to claim 28, wherein said contacting medium is at least one of indium and thermally conducting glue.

30. The solid state laser medium according to claim 27, wherein the heat flow from the laser medium substantially has an one-dimensionality.

31. A diode-pumped laser operating in a fundamental mode, comprising:
a laser means for producing a high aspect ratio beam comprising a diode pumping array and optical means for imaging a pump light beam into a substantially asymmetrical spot with a smooth intensity profile; and
a laser medium which is excited by said pump light beam, wherein an axis of the pump light beam is positioned at least one of obliquely and vertically to an axis of the fundamental mode of the laser medium, wherein the laser medium is bonded to a heat sink on a bottom side of the laser medium, wherein the pump light beam is incident on a top side of the laser medium, and wherein the fundamental mode of the laser medium is operated perpendicular to a heat flow in the laser medium.

32. The diode-pumped laser as in claim 31, wherein the fundamental mode is strongly elliptical within the laser medium.

33. The diode-pumped laser as in claim 32, wherein the fundamental mode has an aspect ratio of >15:1.

34. The diode-pumped laser as in claim 32, wherein the pump light beam has an aspect ratio of >15:1.

35. The diode-pumped laser as in claim 31, further comprising cavity-forming means, whereby a reflective cavity element closest to an entrance face of said laser medium is not in direct contact with said entrance face.

36. The diode-pumped laser as in claim 31, wherein the laser medium is a thin disc laser medium.

37. The diode-pumped laser as in one of the claim 31, wherein the pump light beam has a double or multiple bounce configuration.

38. The diode-pumped laser as in claim 37, wherein a bottom surface of the top side of the laser medium is coated for reflection of the pump light beam.

39. The diode-pumped laser as in claim 31, wherein the laser medium is bonded to the heat sink by at least one of indium foil and glue.

40. The diode-pumped laser as in claim 39, wherein the glue comprises thermally conductive glue.

41. The diode-pumped laser as in claim 31, further comprising a modelocking device.

42. The diode-pumped laser as in claims 41, wherein the modelocking device further comprises at least one of a semiconductor saturable absorber mirror and a stably intracavity-converted continuous-wave laser.

43. The diode-pumped laser as in claim 31, further comprising a frequency conversion device.

* * * * *